United States Patent
Criminisi et al.

(10) Patent No.: US 7,512,262 B2
(45) Date of Patent: Mar. 31, 2009

(54) STEREO-BASED IMAGE PROCESSING

(75) Inventors: Antonio Criminisi, Lower Cambourne (GB); Andrew Blake, Stapleford (GB); Geoffrey Cross, Oxford (GB)

(73) Assignee: Microsoft Corporation, Redmond, WA (US)

( * ) Notice: Subject to any disclaimer, the term of this patent is extended or adjusted under 35 U.S.C. 154(b) by 741 days.

(21) Appl. No.: 11/066,946

(22) Filed: Feb. 25, 2005

(65) Prior Publication Data
US 2006/0193509 A1    Aug. 31, 2006

(51) Int. Cl.
G06K 9/00    (2006.01)
(52) U.S. Cl. .................. 382/154; 382/106; 382/190
(58) Field of Classification Search .......... 382/154, 382/190, 106
See application file for complete search history.

(56) References Cited

U.S. PATENT DOCUMENTS

| | | | |
|---|---|---|---|
| 5,581,625 A | | 12/1996 | Connell |
| 5,692,061 A | * | 11/1997 | Sasada et al. ............. 382/106 |
| 6,094,501 A | * | 7/2000 | Beatty ..................... 382/154 |
| 6,445,810 B2 | | 9/2002 | Darrell et al. |
| 6,674,877 B1 | | 1/2004 | Jojc et al. |
| 6,680,745 B2 | | 1/2004 | Center et al. |
| 6,850,265 B1 | | 2/2005 | Strubbe et al. |
| 2003/0103647 A1 | | 6/2003 | Rui et al. |
| 2003/0107649 A1 | | 6/2003 | Flickner et al. |
| 2003/0169907 A1 | | 9/2003 | Edwards et al. |
| 2004/0212725 A1 | | 10/2004 | Raskar |
| 2004/0252862 A1 | * | 12/2004 | Camus et al. ............. 382/104 |
| 2005/0196015 A1 | * | 9/2005 | Luo et al. ................ 382/103 |

(Continued)

FOREIGN PATENT DOCUMENTS

GB    2353429    2/2001

(Continued)

OTHER PUBLICATIONS

Bakos et al, "Simplistic Dynamic Image Based Rendering," Conf. on Computer Graphics and Interactive Techniques, ACM Press, 2003, pp. 257-258,303.

(Continued)

*Primary Examiner*—John B Strege

(57) ABSTRACT

Images of the same scene from multiple cameras may be use to generate a stereo disparity map. At least a portion of the stereo disparity map may be compared to a kernel image to detect and/or determine the location of an object in the disparity map. The kernel image is an array of pixel values which represent the stereo disparity of an object to be located, more particularly, the kernel image indicates the 3-dimensional surface shape of the object to be located from a point of view. The disparity map containing the located object may be process to manipulate the display of the stereo-based image and/or an input image. For example, the display of the image may be cropped and/or zoomed, areas of the image that are not the located object may be modified, an object such as an emoticon or smart-emoticon may be virtually inserted into the three dimensions of the image and may interact with the object, the location of the object in the image may localize further searches, presence of the located object in the image may indicate selected storing of the image and/or image indexing, and/or the located object in the image may be used as a non-standard input device to a computing system.

19 Claims, 22 Drawing Sheets

U.S. PATENT DOCUMENTS

2006/0013473 A1* 1/2006 Woodfill et al. ............. 382/154
2007/0183651 A1* 8/2007 Comaniciu et al. .......... 382/154

FOREIGN PATENT DOCUMENTS

WO WO 01/82626 11/2001

OTHER PUBLICATIONS

Chen et al., "Toward A Compelling Sensation of Telepresnece: Demonstrating a protal to a distant (static) office," IEEE Visualization, Oct. 2000, pp. 327-333.

Criminisi et al., "Gaze Manipulation for One-to-One Teleconferencing," http://research.microsoft.com/research/pubs/view.aspx?tr_id=703, Sep. 2003, pp. 1-8.

Darrell et al., "Plan-view trajectory estimation with dense stereo background models," Proc. Computer Vision, 2001, pp. 1-8.

Demirdjian et al., "Activity maps for location aware computing," IEEE applications of computer vision, Dec. 3-4, 2002, pp. 70-75.

Demirdjian et al., "Real-time Audio-visual Tracking for Meeting Analysis," ICMI, Oct. 13-15, 2004, pp. 331-332.

Eveland et al., "Background Modeling for Segmentation of Videorate Stereo Sequences," ACM Machine Vision and Applications, vol. 13, No. 3, Jul. 2002, pp. 164-173.

Kum et al., "Real-Time Compression for Dynamic 3D Environments," ACM Multi Media, Nov. 4-6, 2003, pp. 185-194.

La Cascia et al., "Fast, Reliable Head Tracking under Varying Illumination," IEEE PAMI, vol. 21, No. 6, Jun. 1999, pp. 322-336.

Li et al., "FloatBoost Learning and Statistical Face Detection," IEEE Transaction of Pattern Analysis and Machine Intell., vol. 26, No. 9, Sep. 2004, pp. 1-12.

Lok et al., "Online Reconstruction for Interactive virtual Environments," ACM Interactive 3D Graphics, Mar. 2001, pp. 69-73.

Matusik et al., "Image Based Visual Hulls," ACM Siggraph, 2000, pp. 369-374.

Prince et al., "3D Live: Real;-Time Interaction for Mixed Reality," ACM Computer Supported Cooperative Work, 2002, pp. 364-371.

Sand et al., "Video Matching," ACM Transaction on Graphics, vol. 22, No. 3, pp. 592-299, 2004.

Sawhney et al., Hybrid Stereo Camera: an IBR Approach for synthesis of very high resolution stereoscopic image sequences, ACM Siggraph, 2001, pp. 451-460.

Strom et al., "Model-Based Real-Time Head Tracking," EURASIP J. on Applied Signal Processing, vol. 10, 2002, pp. 1039-1052.

Wang et al., "Face Tracking using Motion-Guided Dynamic Template Matching," Asian conf. on Computer Vision, Jan. 23-25, 2002, pp. 1-6.

* cited by examiner

STEREO-BASED IMAGE PROCESSING

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Exemplary Operating Environment

Figure 1:
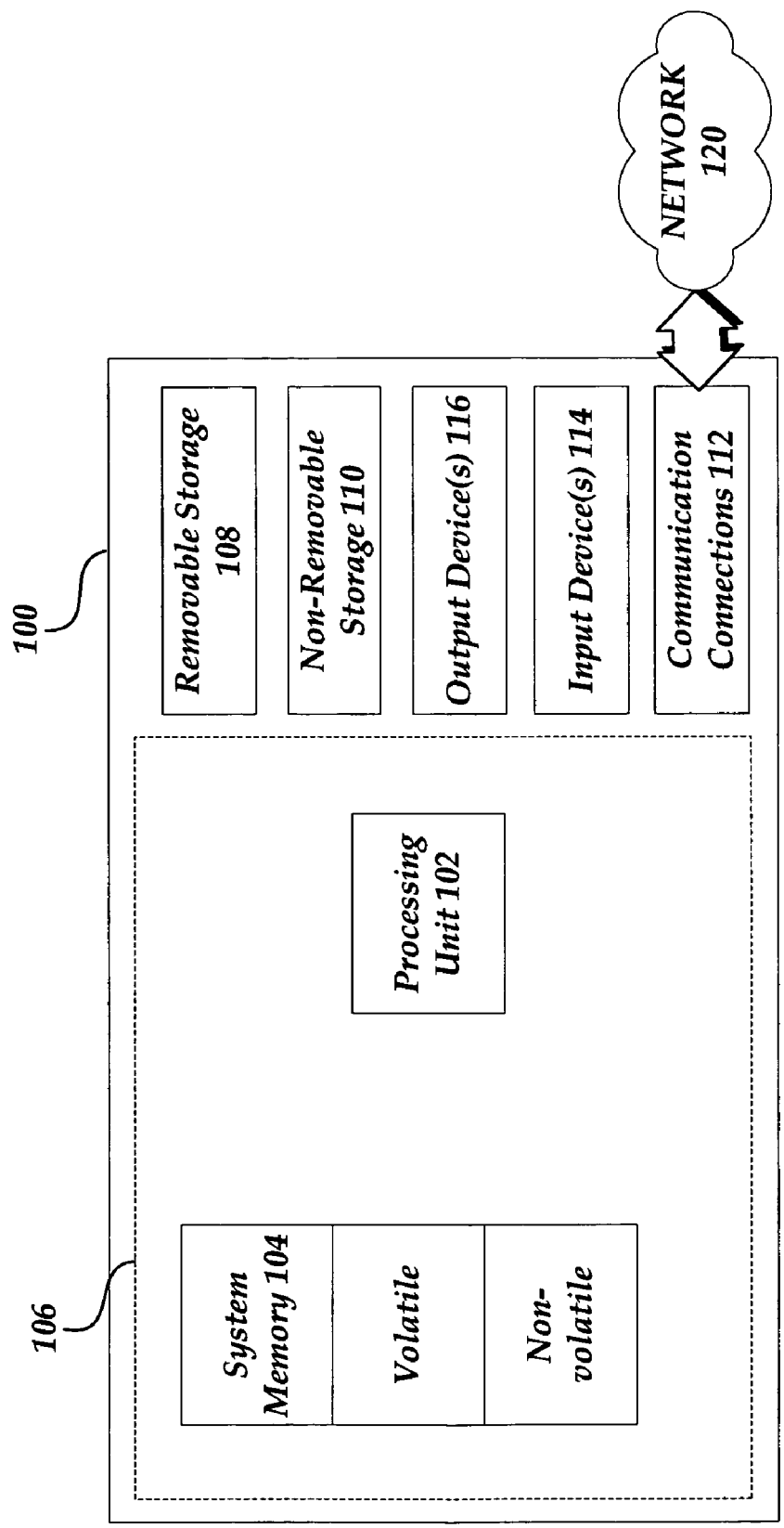
FIG. 1 is an example computing system for implementing a stereo-based image processing system.

FIG. 1 and the following discussion are intended to provide a brief, general description of a suitable computing environment in which a stereo-based image processing system may be implemented. The operating environment of FIG. 1 is only one example of a suitable operating environment and is not intended to suggest any limitation as to the scope of use or functionality of the operating environment. Other well known computing systems, environments, and/or configurations that may be suitable for use with a stereo-based image processing system described herein include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

Although not required, the stereo-based image processing system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 1, an exemplary system for implementing the stereo-based image processing system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communication connection(s) 112 that allow the device 100 to communicate with other devices, such as with other computing devices through network 120. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes both storage media and communication media.

Device 100 may also have input device(s) 114 such as keyboard, mouse, pen, voice input device, touch input device, laser range finder, infra-red cameras, video input devices, and/or any other input device. Output device(s) 116 such as one or more displays, speakers, printers, and/or any other output device may also be included.

Digital video cameras are useful in both consumer and professional contexts. Generally, digital video cameras capture sequences of digital images, which may then be transferred to a computer system for display or processing or to a storage device for storage. One example employs a digital video camera in a video conferencing application. In a typical video conference, an image sequence depicting a conference participant is transmitted to one or more other participants. Concurrently, image sequences depicting the other participants are transmitted to the first participant's display device. In this manner, each participant can view an video of the other participants during the conference.

In a typical video teleconferencing environment, a single video camera is focused on a conference participant, who views the other participants in a video window in his or her display device. The video camera is commonly mounted on or near the display of a computing or television system with a wide field of view in an attempt to keep the participant framed within the field of view of the video camera. However, the wide filed of view also captures the background of the scene.

Stereo-Based Image Processing System

Figure 2:
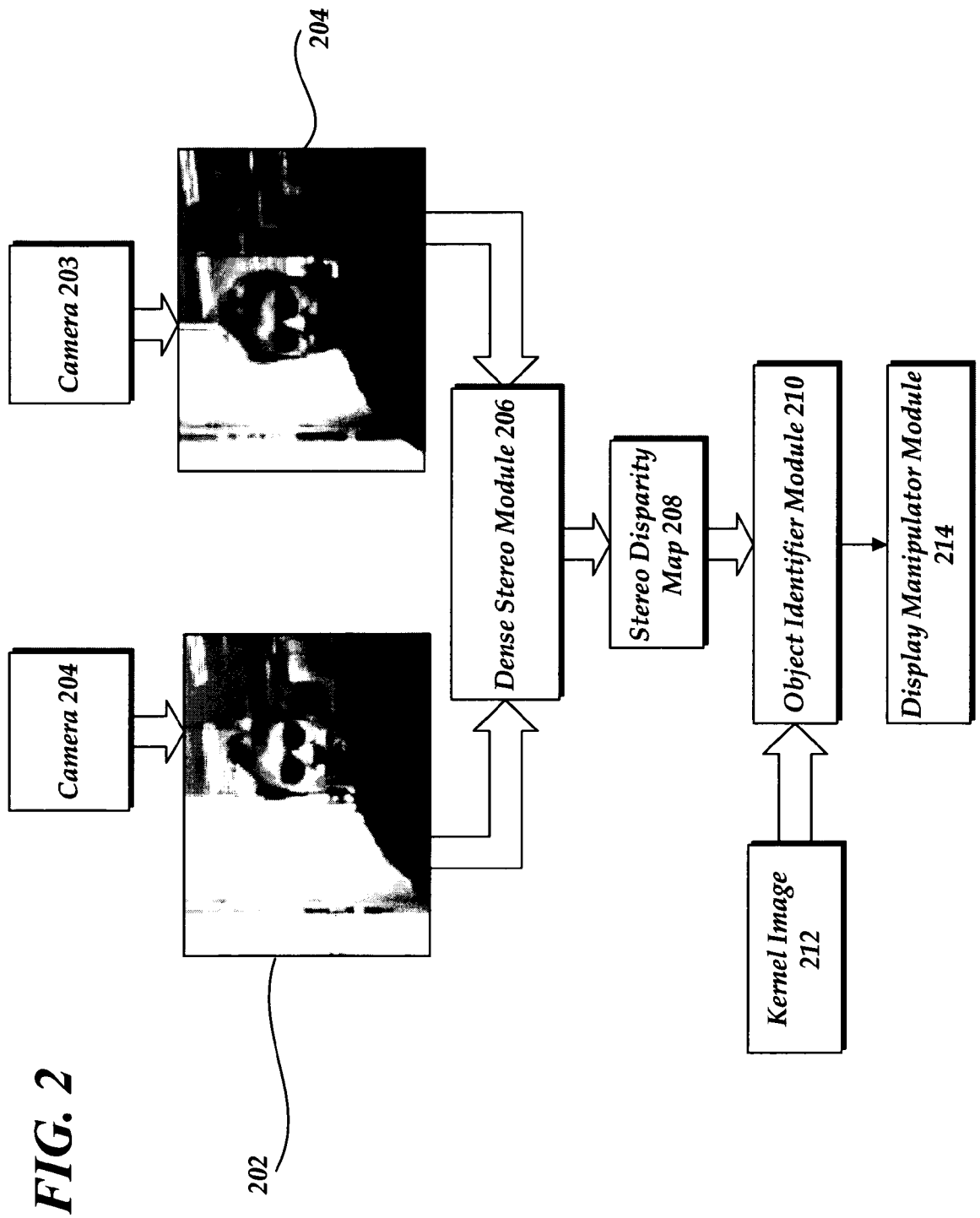
FIG. 2 is a dataflow diagram of an example stereo-based image processing system.

A stereo-based image may be formed from a stereo pair of images captured by a pair of cameras and processed to produce a modified single stereo-based image. Processing of the stereo pair of images may improve locating and/or tracking objects within the captured scene. More particularly, processing of a pair of images in creating the stereo-based image may use a multi-layer graph using a dense stereo engine. Any suitable dense stereo engine may be used, including dense stereo dynamic programming. The multi-layer graph may distinguish between stereo disparities caused by objects captured by two or more cameras viewing a scene. FIG. 2 illustrates an example stereo-based image processing system 200 for detecting an object in a stereo-based image. In the stereo-based image processing system, a left image 202 is captured by a camera 201 mounted on the left. Likewise, a right image 204 is captured by a second camera 203 mounted on the right. If the fields of view of each camera overlap at least a portion of the same scene, one or more objects of the scene can be seen in both images.

The left and right images 202, 204 may be input to a dense stereo module 206, which generates a stereo disparity map 208 for each corresponding pair of epipolar lines of the images 202, 204. The disparity map is an array of pixel values which represent the stereo disparity between the left and right images at matching pixels. To generate the disparity values of the disparity map, any suitable dense stereo algorithm may be used. For example, a four-plane model for the dynamic programming may be used, although other graphs may be employed, such as a three-plane model, a single plane model, and the like. It is to be appreciated that the dense stereo module may accept input from more than two cameras, and moreover, the cameras may have alternative orientations and/or locations as long as their respective viewing planes are spatially located from each other and capture at least a portion of the same scene.

The stereo disparity map 208 from the dense stereo module 206 may be input to an object identifier module 210 to detect and/or determine the location of an object in the disparity map 208. The object may be located by comparing a disparity based kernel image 212 with at least a portion of the stereo disparity map 208 to determine matching disparity values. In this manner, the kernel image is an array of pixel values which represent the stereo disparity of an object to be located. More particularly, the kernel image encodes not just the silhouette of the object to be located, but also the internal shape of the object to be located, e.g., the 'bumpiness' of the object. In this manner, the kernel image indicates the 3-dimensional surface shape of the object to be located from a point of view.

In the illustrated implementation, the object to be located is a person's head, e.g., the kernel image 212 represents a 3-dimensional surface profile of a person's head and possibly their shoulders. However, any object may be determined by generating a suitable kernel image of any object to be tracked, e.g., sporting equipment such as a ball, a missile, a vehicle, or any other appropriate object to be located and/or tracked.

The disparity map containing the located object may be input to a display manipulator module 214 to manipulate the display of the stereo-based image and/or an input image. For example, the area portion of the disparity map may be matched and/or associated with a correlated object portion of the stereo-based image and/or an input image. In some cases, the central location of the located object may be determined in the stereo-based image and/or an input image. In other cases, the location of the located object may be used to initiate a foreground/background separation algorithm. More particularly, a pixel by pixel determination may be made based on factors such as the disparity map information, color values, texture values, and the like.

The location of the located object in the stereo-based image and/or an input image may be indicated in any suitable manner. For example, the disparity data, pixel locations, or any other suitable indicator of the located object may be associated with the image as meta-data. The meta-data may be incorporated into the image, stored in an associated data store, and/or transmitted using communication media. The image with the located object may be used by the display manipulator module to perform some action or it may be sent to another application.

For example, the display manipulator module 214 may crop the display of the image to frame the located object and/or zoom in on the object. Alternatively or additionally, the background, e.g., those areas of the image that are not the located object, may be modified. For example, all or a portion of the background may be faded, blurred, replaced with an alternative scene, color modified, and the like, to focus attention on the located object, to conceal distracting or confidential backgrounds, and the like. Alternatively or additionally, an object such as an emoticon or smart-emoticon may be virtually inserted into the three dimensions of the image and may interact with the object such as orbit around the object. The display of the smart-emoticon as it orbits the object may accurately indicate when the smart-emoticon is occluded by the object, and when the object is occluded by the smart-emoticon. In another example, the located object may include a person's head. In this manner, the located head-shaped object may localize further searches for facial features, such as for face recognition. In another example, presence of the located object in the image may indicate some further action, e.g., selected storing of the image, image indexing, user status in an electronic messenger application, proximity warnings, and the like. In yet another example, the position and/or orientation of the object in the image may be used as a non-standard input device to a computing system. In another example, the depth and/or position of the located object in the image may provide feedback to operation of a camera system.

Stereo Disparity Map

The dense stereo module 206 generates the stereo disparity map 208 by comparing the left and right images 202, 204 captured from the synthesized and rectified cameras 201, 203. Although any suitable dense stereo engine may be used to generate the stereo disparity map, the following example describes a dynamic programming implementation.

An epipolar line (or scan line) of the observed (i.e., captured) left and right images 202, 204 may be represented by intensity functions $L=\{L_m$, where $m=0, \ldots, N\}$ and $R=\{R_n$, $n=0, \ldots, N\}$ respectively. The pixel value $L_m$ and $R_n$ may take on any suitable value, such as intensity value. In one implementation, each image 202, 204 contains color pixels in three color channels such that $L_m, R_n \in \Re^3$. In a more general setting, there may be other features, such that $L_m, R_n \in \Re^f$, where f is an integer. For example, groups of pixels may be filtered to obtain improved invariance to illumination variations or non-uniform camera sensitivities.

A matched pair $(L_m, R_n)$ has 'stereo disparity' of $d=n-m$, which may be considered a measure of parallax, or the apparent displacement of an object caused by a change in the position from which it is viewed. Thus, the disparity map 208 may be considered a pseudo-image where the value of each pixel represents the stereo disparity between the left and right images. The disparity values may be generated in any suitable coordinate frame and/or according to any suitable reference, such as a virtual cyclopean image frame of reference, and the like. One suitable example of generating a disparity map is discussed further in U.S. application Ser. No. 10/763,453 filed Jan. 23, 2004, titled VIRTUAL CAMERA TRANSLATION, and is incorporated by reference herein.

The stereo disparity of matching pixels may be determined with a matching cost function. A matching cost function may be used to determine the minimum cost path in the stereo disparity map. A variety of cost matching functions may be employed to compute the matching pixels, including processing individual epipolar line pairs independently, using neighborhood windows to compute the set of matching two pixels, and the like. For example, a Normalized Sum of Squared Differences matching function, a Normalized Cross Correlation matching cost function, a limitation shiftable window approach, a rectangular window approach, and the like may be used.

Figure 3:
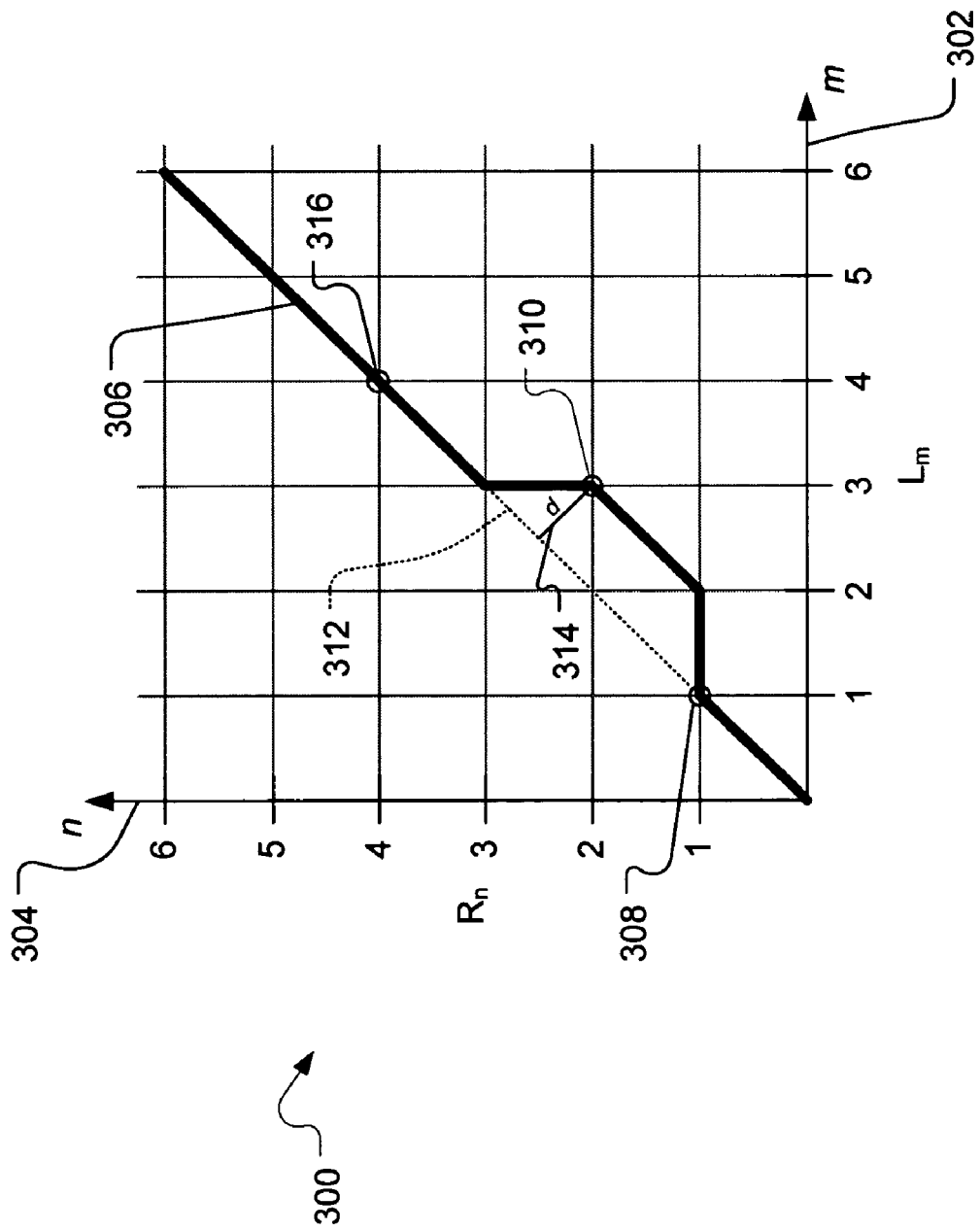
FIG. 3 is a graph illustrating an example stereo disparity as a function of left and right epipolar lines L and R, which are defined in terms of pixel coordinates m and n, respectively.

FIG. 3 illustrates an example diagram 300 with stereo disparity as a function of left and right epipolar lines L and R, which are defined in terms of pixel coordinates m and n, respectively. The stereo disparity between the left and right stereo images of FIG. 3 is defined as a vector $d=\{d_k, k=0, \ldots, 2N\}$ having components expressed in coordinates k of a cyclopean coordinate frame of reference. The diagram 300 shows an axis 302, representing a sequence of positions along a left epipolar line L, and another axis 304 representing a sequence of positions along a right epipolar line R. A minimum cost path 306 indicates matches between pixels in given sequential positions in L with pixels in given sequential positions in R. For example, pixel 1 of L matches pixel 1 of R, as shown by point 308. In contrast, pixel 3 of L matches pixel 2 of R, as shown by point 310. The disparity associated with a point 310 on the minimum cost path 306 is defined as the orthogonal distance of the point from a virtual scan line 312 (or zero disparity axis or zero parallax axis). For example, the disparity of the point 308 is zero, whereas the disparity d of the point 310 is shown by line 314. (As suggested by the disparity axis of FIG. 4, the disparity of point 310 is "−1".)

Accordingly, the minimum cost path 306 represents a two-dimensional profile of a scan line of the virtual image, where pixels with a greater absolute value of disparity (e.g., point 310, which has a negative disparity relative to the zero parallax line 312) are closer to the virtual cyclopean camera—e.g., the video subject—than pixels with a lower absolute value of disparity (e.g., point 316, which has a zero disparity relative to the zero parallax line 312), which are deemed farther away from the virtual cyclopean camera—e.g., the background. Stacking a set of these two-dimensional profiles, which correspond to individual cyclopean epipolar lines, can yield a three-dimensional profile surface of the image subject.

Figure 4:
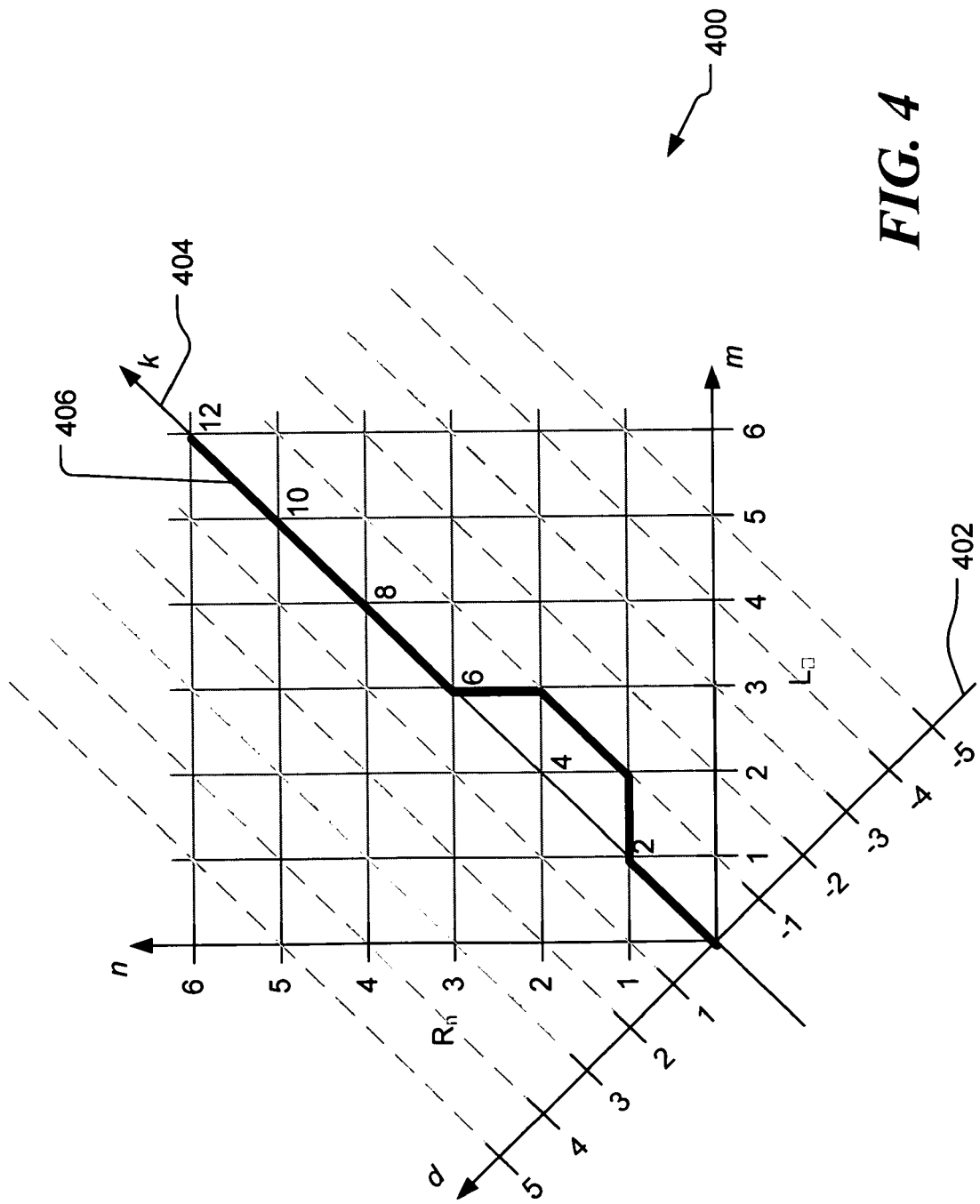
FIG. 4 is a graph illustrating example disparity and cyclopean axes overlaid on the L and R axes of FIG. 3.

FIG. 4 illustrates disparity and cyclopean axes overlaid on the L and R axes to show an exemplary stereo disparity graph 400. Based on the disparity axis 402, a disparity vector d in cyclopean coordinates k along the cyclopean axis 404 can be graphed into the pixel coordinates m and n. The cyclopean coordinate k corresponding to pixel coordinates m and n is computed as $k=m+n$. The bold line marks the minimum cost path 406 in the stereo disparity graph 400.

Different segments of the minimum cost path 406 represent different characteristics of the stereo images. A diagonal path on the $d=0$ axis (as seen between $k=0$ to 2) represents a zero-disparity, linear match between pixels in the epipolar lines of the right and left images. This linear match might happen, for example, when the pixels are of distant objects in which no parallax is evident. In contrast, a diagonal path off of the $d=0$ axis (as seen between $k=3$ to 5) represents a disparate (disparity=−1), linear match between pixels in the epipolar lines of the right and left images. In both cases, a diagonal line on the minimum cost path 406 represents matched pixels.

Horizontal and vertical lines (as seen between $k=2$ to 3) in the minimum cost path 406 have traditionally been considered to represent only occluded regions. For example, in FIG. 4, horizontal lines would be deemed to indicate pixels that are occluded from the right camera, while vertical lines would be deemed to indicate pixels that are occluded from the left camera. However, horizontal and vertical lines may be considered to indicate at least either occluded pixels or matched pixels of non-fronto-parallel surfaces. Non-fronto-parallel surfaces may cause multiple pixels from one camera image to match with a single pixel in the other camera image, thereby inducing a horizontal or vertical line in the stereo disparity graph.

Since the stereo disparity map 208 of FIG. 2 is formed from the images 202, 204 from the first and second cameras 201, 203, each pixel value of the stereo disparity map indicates how much that pixel has moved between the two input images (or is occluded from either of the two images). Thus, the stereo disparity map includes a representation of non-occluded objects within the scene viewed by cameras 201, 203, e.g., foreground and background objects. In this manner, the disparity map may be used to detect and/or distinguish between objects within the stereo-based image based upon the disparity of pixels.

Kernel Image

The kernel image 212 of FIG. 2 is a disparity map which represents a 3-dimensional planar surface of a desired object to be located in the stereo images from cameras 201, 203. Thus, the kernel image 212 is a generated stereo disparity map where each pixel value shows how much that pixel has moved between a virtual left and right image (or occluded from the left or right view) as if taken by the cameras 201, 203. The kernel image may be formed from one or more sample disparity maps based on images of the represented object taken by cameras 201, 203. For example, if the object to be located is a profile of a person, e.g., head and shoulders, the kernel image may illustrate the disparity information of a general head and shoulders profile surface shape. The kernel image of a person's head and shoulders may be formed from a pair of stereo images of a sample person taken by cameras 201, 203, and compared to form a disparity map which may be used as the kernel image. In some cases, a user or search algorithm may provide a localized area of the sample disparity map representing the desired object. In a further example, the disparity maps of several people may be averaged or combined in any other suitable manner to form the kernel image. In another example, the first or other selected images from cameras 201, 203 may be used to form the kernel image. For example, images of the actual user or other object may be used to form the kernel image.

The example disparity map of standard or input images of a desired object may be modified to form the kernel image. For example, the disparity values indicating the presence of a person's head and shoulders relative to the background may be expanded horizontally such that the model person's head is indicated in the kernel image as 1.5 to 2.5 times wider than indicted in the original disparity map. More particularly, the disparity values in the kernel image may be increased in the horizontal direction to increase the horizontal size of the represented object to approximately 2 times the actual size of the represented object. The size of the kernel image, e.g., its pixel area or array size, may be any suitable size to include the disparity values of the represented object. For example, kernel image may be in the range of approximately one half to approximately one quarter of the size of the input stereo images.

A kernel image representing an object with an expanded horizontal distance may allow the located object to include not only the actual desired object, but may also distinguish and/or locate any objects located proximate to the represented object. For example, a kernel image indicating a person's head and shoulders may be modified to expand the head portion in the horizontal direction to 1.5 to 2 times the width of a person's head. In this manner, additional object proximate a person's head and having similar depth characteristics or values represented in the disparity map may be included in a determination of the located 'object.' More particularly, the located 'object' in the disparity map may not only include an object distinguished as a person's head but also any other objects that are close to the person's head, such as a book or other object held proximate the person's head displayed in the stereo-based image.

Figure 5:
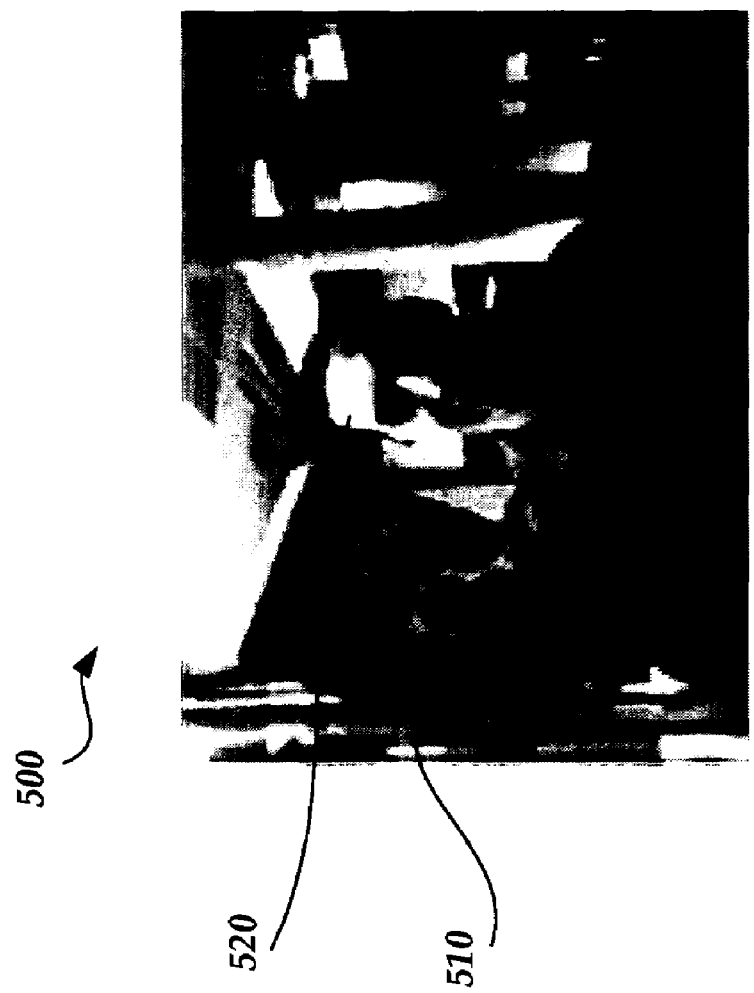
FIG. 5 is an image illustrating an example stereo-based image.
Figure 6:
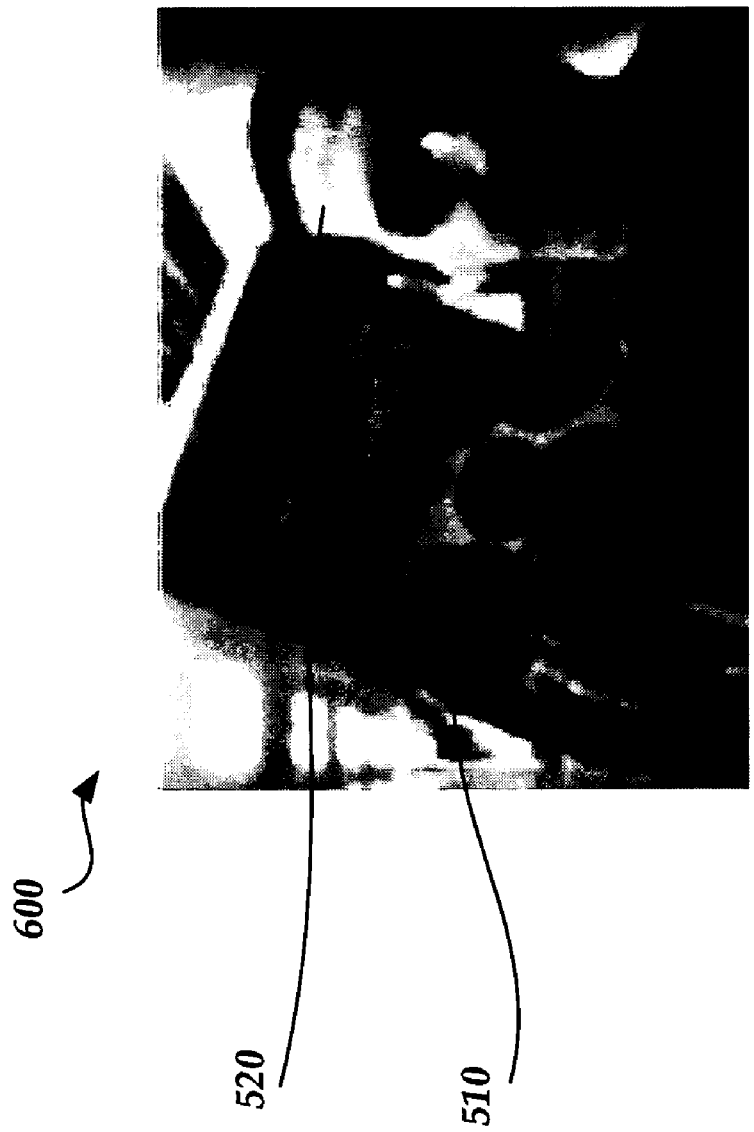
FIG. 6 is an image illustrating an example smart frame of the located object in the example stereo-based image of FIG. 5.

An example of additional object(s) being incorporated into the located object is illustrated in FIGS. 5-6. More particularly, the illustrated book 510 in FIG. 5 is shown laterally proximate to the person's head 520. In this manner, a kernel image of a person's head and shoulders may not only locate and/or distinguish the person 520 in image 500, but the kernel image may also incorporate the book 510 as a part of the object of interest to be located. Accordingly, a 'smart frame' framing the located object in image 500 is illustrated as image 600. The smart frame image 600 may include not only the detected person's head 520, but also the proximate book 510.

Locate Object in Disparity Map

The kernel image may be used to locate and/or distinguish the represented object in a disparity map. For example, as shown in FIG. 2, the object identifier module 210 may compare the kernel image 212 with at least a portion of the stereo disparity map 208 from the dense stereo module. To locate the object represented in the kernel image, the kernel image may be compared to successive portions or areas of the disparity map 208. The area portion of the disparity map may contain disparity values representing moving and/or static objects depicted in the images from the cameras. Each pixel of the disparity map may be compared to the kernel image, or alternatively only a portion of the disparity map may be compared. In some cases, the kernel image may be compared to area portions of the disparity map regardless of the depth of the pixel of the disparity map, e.g., both objects which are close and far away may be examined for similarity to the kernel image. Additionally or alternatively, the kernel image may be compared to area portions of the disparity map regardless of movement of the pixel over time. More particularly, the kernel image may be compared to area portions of the disparity map regardless of whether the represented object is moving or stationary in the depicted scene.

A score may be computed for each compared area portion. The best match may be determined by selecting the best match or score based on the kernel image comparisons. The cost or match may be computed using any suitable correlation technique such those used by the signal processing community. The score may be biased or weighted with one or more factors including distance of the located object to the center of the disparity map, depth of the located object (e.g., an object closer to the cameras may be weighted more heavily), prior position of a located object in a prior disparity map, and the like. The score may provide an indication of presence and/or absence in the disparity map of the object represented in the kernel image.

To provide a more accurate match between the kernel image and the area portion of the disparity map to be compared, the size of the kernel image may be modified to indicate the size of the predetermined foreground object (e.g., person's head in this example) based upon the distance indicated by the disparity map. For example, a person's head close to the cameras 201, 203 will appear larger than a person's head farther away from the cameras. The values of the disparity map may indicate the approximate depth range of the object from the cameras. Specifically, the disparity value d stored in the disparity map is related to depth×(normal distance from the image plane) according to the formula:

$$d = K/x$$

where K is a constant related to the internal camera parameters (e.g., focal length) and the distance between the input cameras in the stereo rig (baseline). The determined depth of the area portion of the disparity map may provide an indication of appropriate comparison size for the kernel image. In this manner, the values of the kernel image may be increased or decreased, and/or the size of the kernel image may be increased or decreased in relative size to match the indicated depth of the area portion of the disparity map to be compared. The depth of the disparity map area portion may be determined in any suitable manner, such as an average depth of the disparity values in the disparity map area portion, the depth of the pixel having the least amount of disparity, the depth of the center pixel of the selected area portion of the disparity map, the depth of a selected pixel of the disparity map, and the like.

In a similar manner, the area portion of the disparity map may be selected based upon the indicated depth of one or more pixels of the disparity map. For example, a pixel (e.g., disparity value) may be selected to be compared with the kernel image. The depth of the selected pixel may be determined based upon the disparity value of the pixel. The depth of the pixel may indicate an appropriate border size or area portion surrounding or proximate to the selected pixel to be compared to the kernel image.

Figure 7:
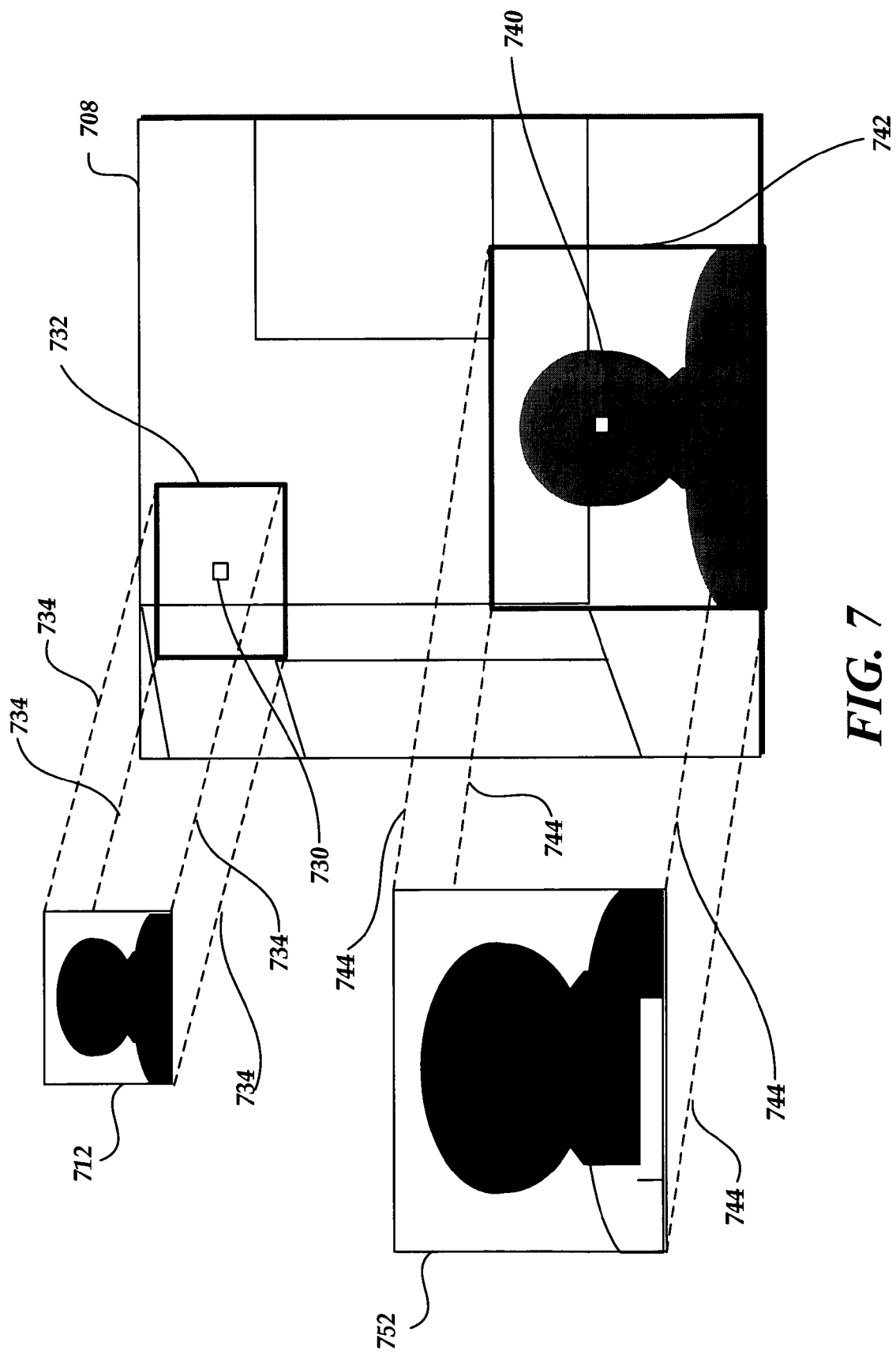
FIG. 7 is a schematic diagram of an example comparison of a kernel image rendering with an area portion of an example disparity map rendering.

FIG. 7 illustrates an example kernel image rendering 712 of the kernel image (e.g., matrix containing the disparity values for the pixels of a stereo-based image) of the represented object which is illustrated as a person's head and shoulders. Similarly, the disparity information of the disparity map is illustrated as a disparity image rendering 708 showing the detected foreground and background features of a person sitting in front of a camera in his office. When comparing the kernel image to an area portion of the disparity map, a pixel of the disparity map may be selected, for example pixel 730. As noted above, the representative pixel disparity, or feature depth, may be determined in any suitable manner. If the depth of pixel 730 is 20 feet, the size of a person's head will be fairly small. Thus, the kernel image may be decreased in size and/or the disparity values modified to reflect the appropriate disparity at that determined depth. Similarly, the comparison area 732 of the disparity map may be modified to match the size of the kernel image at the computed depth. The kernel image may then be compared to the comparison area portion of the disparity map as shown by the broken lines 734. When the representative pixel is pixel 740, the representative depth of the image may be closer, and thus, a person's head may be larger than in the prior example. Accordingly, the kernel image may be enlarged (as represented by kernel image rendering 752) and/or the disparity values increased to reflect an object being closer to the cameras. Similarly, the comparison area portion 742 of the disparity map may be larger than comparison area portion 734. The kernel image 752 may be compared to the comparison area portion 742 as shown by broken lines 744.

The kernel image map may be compared to each set of pixels or area portion of the disparity map in the horizontal and vertical direction to determine the cost of correlation of each set of pixels. A horizontal and vertical search pattern may scan the entire disparity map and the set of pixels of the disparity map 208 which best match the kernel image may be selected. This may be done on the initial step and may be used for each subsequent disparity map from the image stream from the cameras 201, 203. It is to be appreciated that any suitable search protocol may be used. For example, all sets of pixels of the disparity map may be searched and the scores compared to determine the best match. In another example, the kernel image may be compared to portions of the disparity map until a suitable 'best' match is found where the score of a match exceeds a predetermined threshold. The search pattern may be truncated when the suitable match is determined by a cost score that exceeds a predetermined threshold. In another example, a complete search of the disparity map may be used to determine the best match to the kernel image.

Subsequent disparity maps in the image streams from the cameras 201, 203 may initiate the search for the represented object based on the prior location of the object detected in the stereo-based image. For example, the kernel image may be compared to pixels of the disparity map starting at the last known position of the located object. If that section of the disparity map does not provide a score that exceeds a predetermined threshold, the search may spiral outward from that position, on the assumption that the object has not moved substantially in the time difference between disparity map determinations (e.g., subsequent or serial images taken by cameras 201, 203). If the desired object is not located within a small distance of the prior position of the object, the search may continue over the entire disparity map to locate the best match for the desired object.

If more than one object in the disparity map matches the desired object to be located, e.g., the object depicted in the kernel image, each object may be indicated as a located object. Alternatively, the most likely object may be selected based upon one or more factors including the likelihood score, shortest distance to the center of the disparity map, closest distance to the located object in the prior disparity map, closest depth distance to the cameras, and the like.

The correlation score or cost of a match between the kernel image and the selected comparison area of the disparity map may be biased or modified based upon the one or more factors including distance to the center of he disparity map, distance to the located object in a prior disparity map, closest depth distance to the cameras, and the like. For example, the scores of pixel comparisons between the kernel image and the disparity map may be biased to the location where the object was located in the previous disparity map. In another example, the matching score may additionally or alternatively be biased to placement of the object in the center of the disparity map (e.g., the center of the stereo-based image based on images from cameras 201, 203).

In one example, the score of the predetermined foreground object of the kernel image being apparent in the comparison area of the disparity map may be a likelihood score s based on the equation:

$$s = \alpha b_1 + \beta b_2 + \gamma c$$

where the bias $b_1$ is the distance of the point from the previously estimated position of the object, the bias $b_2$ is the distance of the point from the center of the image, and c is the correlation score (e.g., signal processing techniques) with the kernel image, and the coefficients are bound by $\beta < \alpha < \gamma$. The point (cx, cy) with the best score s may be considered a good estimate of the position of the represented object, e.g., head.

The values of the coefficients $\beta$, $\alpha$, and $\gamma$ may depend on a variety of factors including the setup of the input cameras, the frame-rate, the scenario, and the like. In some cases, the coefficient $\beta$ may bias the score based on the motion of the location object between two frames. More particularly, if the coefficient $\alpha$ is large, then little motion may be expected between frame n and frame n+1. Thus, the score may be biased to penalize those cases where motion is large. For example, at 25 frames per second from the input cameras, it may be unlikely that the motion between two frames is going to be significant. However, if the cameras provide input images at 3 frames per second, then it may be more likely that the motion will be significant. The coefficient $\beta$ may bias the score towards objects located towards the center of the image. More particularly, if the coefficient $\beta$ is large, then the score may be biased toward an expectation of locating the desired object (such as a head) towards the center of the image, and a similar object at the edge of the image is unlikely. For example, in a video conferencing application, the head is more likely towards the center of the image. However, this may not be the case in other applications, such as security camera footage, and the like. The coefficient $\gamma$ may help determine the relative value of the score (e.g., relative to the correlation score of another location in the image). For example, the coefficient $\gamma$ may be set to one. In one video conferencing example with 10 frames per second and input images being sized 320×240 pixels, and the input cameras being approximately 3 cm apart, the ratio of $\alpha/\beta$ may be set approximately equal to 100. It is to be appreciated that any suitable values may be used for any of the coefficients $\beta$, $\alpha$, $\gamma$ as appropriate for the application and may be determined using heuristics, empirical data, user input, default values, and the like.

To increase the accuracy of determining a vertical position of the represented object of the kernel image, the top of the foreground object (e.g., head) may be 'clamped'. For example, the disparity d may be determined for the point (cx, cy) of the center position of the object (e.g., head) of the disparity map. A comparison disparity $d_i$ may be computed for each point (cx, cy-i) of the disparity map, where i iterates from 1 to 240, or any other suitable range based upon the number of vertical pixels in the disparity map. If the comparison disparity $d_i$ is less than a predetermined percentage of the disparity d of the center location of the located object, the point (cx, cy-i) may be indicated as the 'top' of the represented object. The predetermined percentage may be any suitable percentage, such as 75%. The center point of the located object may then be corrected, e.g., re-selected, to reflect the center position of the represented object based on the top of the object location and the determined distance of the object based on disparity values from the disparity map. If the comparison disparity is not greater than the last computed disparity d at the center position of the object (cx, cy), then the last known center position may be used.

The score for each comparison area in the disparity map may be computed for every stereo disparity map in a sequence of stereo maps based on a sequence of images or video streams from cameras 201, 203 of FIG. 2. Alternatively, the scoring process may be done on selected disparity maps, such as at a predetermined frequency such as every fifth disparity map. In a further example, the frequency of kernel image comparison may be increased when movement or movement exceeding a predetermined threshold is detected in the input images.

The kernel image compared to the disparity map at each selected time frame of stereo images may be static over each comparison, e.g., each kernel image used represents a similar planar surface profile of the represented object. For example, the same kernel image may be used each time a comparison is made to the series of disparity maps based on the video streams from the input cameras. The static kernel image may be appropriate in cases where the object to be located has a fairly static surface profile or silhouette from a wide range of camera viewpoints, e.g. when the camera is moving horizontally. For example, a person's head has a similar blob on shoulders surface profile in all horizontal directions. Accordingly, a static kernel image of a person's head may be appropriate, even if a person rotates his head to look left or right. It is to be appreciated that although the kernel image is static, the static size of the kernel image may be adjusted to represent the relative size of the object at the depth indicated in the disparity map.

In some cases, the surface profile of a selected foreground object may not be static in all horizontal directions, e.g., a car. In this manner, the kernel image may be dynamic or modified over time, or multiple kernel images may be compared to portions of the disparity map to locate the desired object in the stereo-based image. For example, one or more kernel images may be compared to one or more portions of the disparity map to locate the desired object. The disparity values of the located object may then be used as the basis for a modified kernel image for comparison with a subsequent disparity map. In this manner, a slowly changing object may be located within the series of disparity maps assuming that the surface shape or profile of the object does not substantially change between each successive disparity map being compared.

The best matching comparison area of the disparity map may be indicated in any suitable manner. For example, a predetermined pixel of the comparison area (e.g., the center, corner or other pixel may be associated with the determined score, a match indicator, or the entire comparison area of the disparity map may be saved as a located disparity map image associated with the disparity map for those incoming stereo images. The match indicator may be any suitable indicator such as a binary indicator such as a 1 for a match and 0 if no match, a weighted indicator, a value indicating a probability of a match, and the like.

Figure 8:
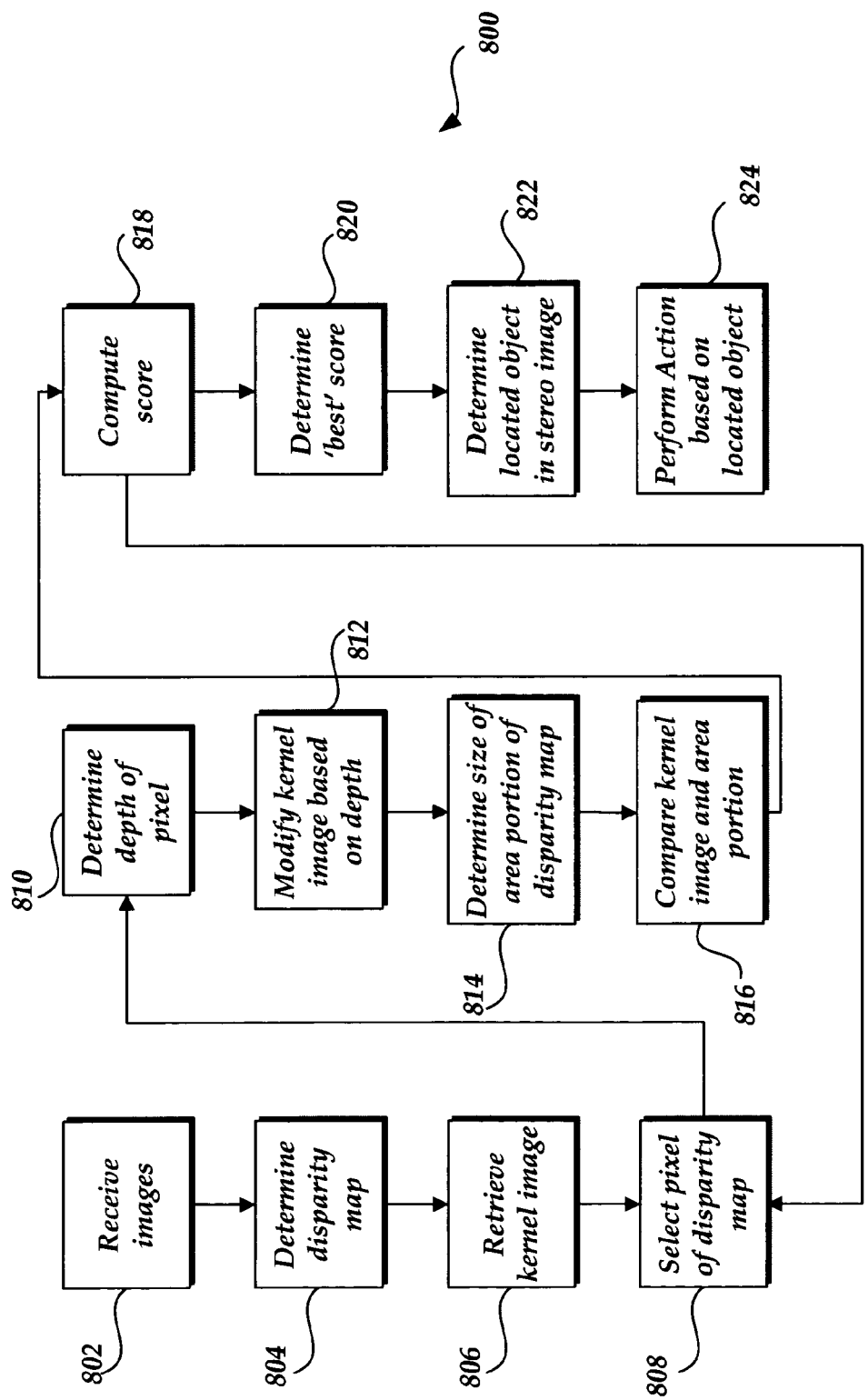
FIG. 8 is a flow chart of an example method of stereo-based image processing.
Figure 9:
FIG. 9 is an example left input image.

FIG. 8 illustrates an example method 800 of a stereo-based image processing system. At least two images may be received 802. For example, with reference to FIG. 2, a dense stereo module 206 may receive a left image 202 and a right image 204. The images and/or cameras providing the images may be suitably synchronized, rectified, and/or calibrated.

The disparity map may be determined 804 based on the received images. As noted above, the disparity map includes an array of pixel values, which indicate the amount of disparity between the received images.

The kernel image may be generated and/or retrieved 806. The kernel image may be selected from one or more available kernel images. The selection may depend on several factors including objects located in a previous image, desired object to be found, and the like. As noted above, the kernel image includes an array of pixel values, which represent the stereo disparity of a predetermined object and/or surface profile. The kernel image may be formed in any appropriate manner, including example stereo images of the current or a prior similar scene or object, an average of one or more disparity maps of the desired object, and the like. The disparity values of the kernel image may be modified to expand the surface profile of the represented object.

One or more pixels may be selected 808 from the disparity map for comparison with the kernel image. Selection of the one or more pixels may depend on several factors such as search pattern or algorithms, depth and/or disparity value of the pixel(s), location of an object in a prior disparity map, and the like. The depth of the one or more pixels may be determined 810 in any suitable manner. For example, a representative pixel may provide the disparity value for a depth determination. Alternatively, an average depth may be determined, and the like.

Based on the determined depth of the selected pixel(s), the kernel image may be modified 812. More particularly, the size of the kernel image may be modified to represent an appropriate perspective of the desired object at the determined depth. Similarly, the size of the area portion of the disparity map to be compared to the kernel image may be determined 814. For example, the number and/or area of pixels in the selected area portion of the disparity map may be increased or decreased to correlate to the size of the kernel image.

The kernel image may be compared to the disparity map 816, and a score or cost may be computed. As noted above, as suitable cost function may be used and may weight the score based on one or more factors including position in the image relative to a prior location and/or center of the image, depth distance, and the like. The process may return to selecting 808 a pixel of the disparity map, until the desired portion of or entire disparity map have been searched and scored. One or more best scores may be determined 820 in any suitable manner. For example, a score may be compared to a predetermined threshold value of a score, the highest score may be selected, and the like. Based on the area portion of the disparity map associated with the selected 'best' score, the location of the located object represented in the kernel image may be determined 822 in the stereo-based image. As noted above, the input stereo images may be processed to form a modified single stereo-based image, and the located object may be located in the stereo-based image. Alternatively and/or additionally, the located object may be located in either or both of the input images. For example, the located object in the disparity map may be associated with the corresponding object in either the left or right images used to form the disparity map.

Based on the location, presence, label, and/or orientation of the located object, an action may be performed 824. As noted above, the displayed image including the located object may be selectively cropped and or zoomed. One or more objects such as a smart-emoticon may be virtually inserted in the displayed image including the located object. Moreover, the object may interact and/or track with the located object based on the indicated position and/or disparity values of the located object. The background, e.g., those portions of the displayed image that doe not include the located object, may be de-emphasized and/or the displayed located object may be highlighted, such as to focus attention of a viewer on the located object. The background may be modified, removed, and/or replaced. The located object may be used to localize a search for further features of a desired object of interest, such as facial features in facial recognition. The presence of a located object in an image may provide an indication of an action. For example, the presence of a located object may be used to selectively store the image, index or label the image, provide a user status in an electronic messenger application, provide a proximity warning, and the like. The position and/or orientation of the object in the image may be used as a nonstandard input device to a computing system. In another example, the depth and/or position of the located object in the image may provide feedback to operation of a camera system.

Applications

The determined location of the desired object in the disparity map represented in the kernel image may be used in various applications. The application using the stereo-based image may incorporate the stereo-based image processing system described above or may receive a stereo-based image with the located image in any suitable manner, such as through communication media. The disparity and/or depth information may also be associated with the stereo-based image, such as in meta-data associated with the image.

Cropping/Zooming

The position of the located object in the disparity map may provide a location for framing the desired object in the displayed stereo-based image. More particularly, portions of the stereo-based image that are not proximate the located object may be cropped from the stereo-based image such that the located object is centered and/or framed in a window having a smaller pixel size than the original size of the input stereo images. In this manner, the cropped image may require less rendering time, less storage memory, and/or less bandwidth in transmission. In one example, the center or other representative pixel of the located object in the disparity map, e.g., (cx, cy), may be projected directly onto the stereo-based image, the input image from the first camera 201, and/or the input image from the second camera 204. This mapping provides a predicted position for the placement of the cropping frame around the located object (e.g., the center of the frame, a corner, and the like). The size of the window containing the located object in the image may be determined in any suitable manner. For example, the size of the window may be based upon the size of the located object, the size of the image, the depth of the located object, a predetermined surrounding area size, the correlation score (e.g., a lower score may indicate a larger window), and the like.

In a further example, the cropped image may be increased in size, e.g., digitally zoomed to increase the display size of the object and retain the pixel size of the original image. The zoom may be based on any suitable technique or function. For example, the zoom may be based on a linear or other function of the correlation score (c) and/or the depth of the located object, and may be centered on any suitable pixel of the image, e.g., the center pixel of the comparison area and/or the located object. In the case of a linear function based on the disparity at the center of the located object (cx, cy), the digital zoom of the stereo-based image may be computed as:

$$zoom = ad + b$$

where a and b are parameters selected to bound the digital zooming to create a frame of a sufficient window size to surround or frame the located object, and d is the disparity of the center pixel of the located object in the disparity map.

The values of the parameters a and b may depend on a variety of factors including the setup of the input cameras, the frame-rate, the scenario, and the like. In some cases, the parameter a may depend on the calibration of the camera. The parameter b may set the amount of overall 'zoom', e.g., define how large the user wishes the object to appear in the displayed image. It is to be appreciated that any suitable values may be used for any of the parameters a and b as appropriate for the application and may be determined using heuristics, empirical data, user input, default values, and the like.

In subsequent searches for the object represented in subsequent disparity maps, e.g., in a stream of images from the cameras, the search may be based on the pixels in the digitally framed and/or zoomed image. If no object is located in the cropped or zoomed image, then the image may be 'zoomed out', e.g., the entire disparity map based on the entire images from the cameras 201, 203 may be searched and/or the zoom set equal to approximately one, or any other suitable zoom value or indication. In another example, the cropped or zoomed image may be incrementally de-cropped or de-zoomed. The unsearched border of the disparity map may be searched in incremental bands. In another example, the image may be cropped to exclude the located image, e.g., the object represented in the kernel image is an object that is not of interest to be displayed. The determination of no object in the disparity map matching the kernel image may be based upon the correlation score, e.g., the best match, being less than a predetermined threshold.

Figure 10:
FIG. 10 is an example cropped and zoomed portion of a right input image corresponding to the image of FIG. 9.
Figure 11:
FIG. 11 is another example left input image.
Figure 12:
FIG. 12 is an example cropped and zoomed portion of a right input image corresponding to the image of FIG. 11.
Figure 13:
FIG. 13 is another example left input image.
Figure 14:
FIG. 14 is an example cropped and zoomed portion of a right input image corresponding to the image of FIG. 13.

Examples of cropped and digitally zoomed images are shown in FIGS. 9-14. More particularly, the image 1000 of FIG. 10 is a digitally cropped and zoomed area portion of a right input image corresponding to the left input image 900 of FIG. 9. The cropped input image 1000 includes the located object, e.g., the person's head 1010. In another example, FIG. 11 shows the left input image 1100 and the image 1200 of FIG. 12 shows the digitally cropped and zoomed area portion of the corresponding right input image of the same scene. The image 1200 includes the located object, e.g., person's head, even though the head is turned in profile. Accordingly, the kernel image may distinguish or locate an object in the disparity map independent of the rotational position or orientation of the object. In yet another example, the image 1400 of FIG. 14 is a digitally cropped and zoomed area portion of the right input image. The right input image corresponds to the left input image 1300 of FIG. 13 of the same scene. The image 1400 includes the located object, e.g., person's head, even though a hand 1412 covers the face 1410. In this manner, the kernel image may distinguish or locate an object in the disparity map independent of the features within the outline of the object's silhouette or profile represented in the kernel image.

The 'smart' framing and/or zooming of the located object may occur in each stereo-based image in an image stream, and thus, may track an object as it moves within the field of view of the cameras. Objects, such as people, within a field of view of a video camera are typically moving with one or both translational and rotational movement. In this manner, it may be difficult to keep the object of interest focused within a static field of view of the video camera or static location of cropping in an image. As noted above, subsequent displayed images may be framed to focus and/or center the located object in the displayed stereo-based image. In this manner, the displayed stereo-based image may 'track' the located object and keep the located object within the displayed cropped frame of the stereo-based image. The displayed frame or portion of the stereo-based image may crop those portions of the observed images from the cameras that are not proximate the located object corresponding to the kernel image.

The size and/or relative position of the cropping frame and/or the amount of zoom may be smoothed or dampened over a series of displayed images to reduce jitter of the frame and/or zoom. More particularly, the placement of the frame and/or zoom may be biased toward the placement and/or zoom of the previous time frame such that the frame movement and zoom change transition slowly and/or smoothly. Any smoothing or damping function may suitable including using an F=ma function on the actual displayed image where m is a mass/inertia parameter set to a value, which gives a smooth transition.

Since the entire disparity map based on the images from the input cameras may be searched, the object to be located does not have to be the closest object to the cameras. Moreover, the background may be dynamic, e.g., people may enter and exit the scene, trees may move in a window, and the like. Even with a dynamic background indicated in the disparity map, the stereo-based image processing system may locate in the disparity map the object represented in the kernel image, whether or not the object is in the foreground (e.g., close to the cameras) or the background (e.g., farther away from the cameras).

Object Insertion

Any object may be inserted into the stereo-based image, the left input image, and/or the right input image. Using the disparity values of located objects in the image, the object may be inserted into the 3-dimensional space of the scene. Although the following example discusses inserting emoticons, it is to be appreciated that a similar technique may be extended to insert any suitable object into an image including an emoticon, a moon, a whiteboard, a tree, and the like.

An emoticon may be virtually inserted into a 3D environment, such as the displayed image. The emoticon may interact with the located object within the displayed image, e.g., is a smart-emoticon. The insertion of the emoticon may be triggered in any suitable manner, including detection of a particular located object, position and/or orientation of the located object, movement of the object over time, manual indication by a user, and the like. The emoticon may be any suitable emoticon, such as a heart, planet, light bulb, stars, and the like. Moreover, the emoticon may be dynamic or an animated emoticon, e.g., may have a changing shape or representation. For example, a heart shaped emoticon may pulse, stars may twinkle, a planet may have orbiting stars or rotating rings, a light bulb may flash on and off, and the like.

Figure 15:
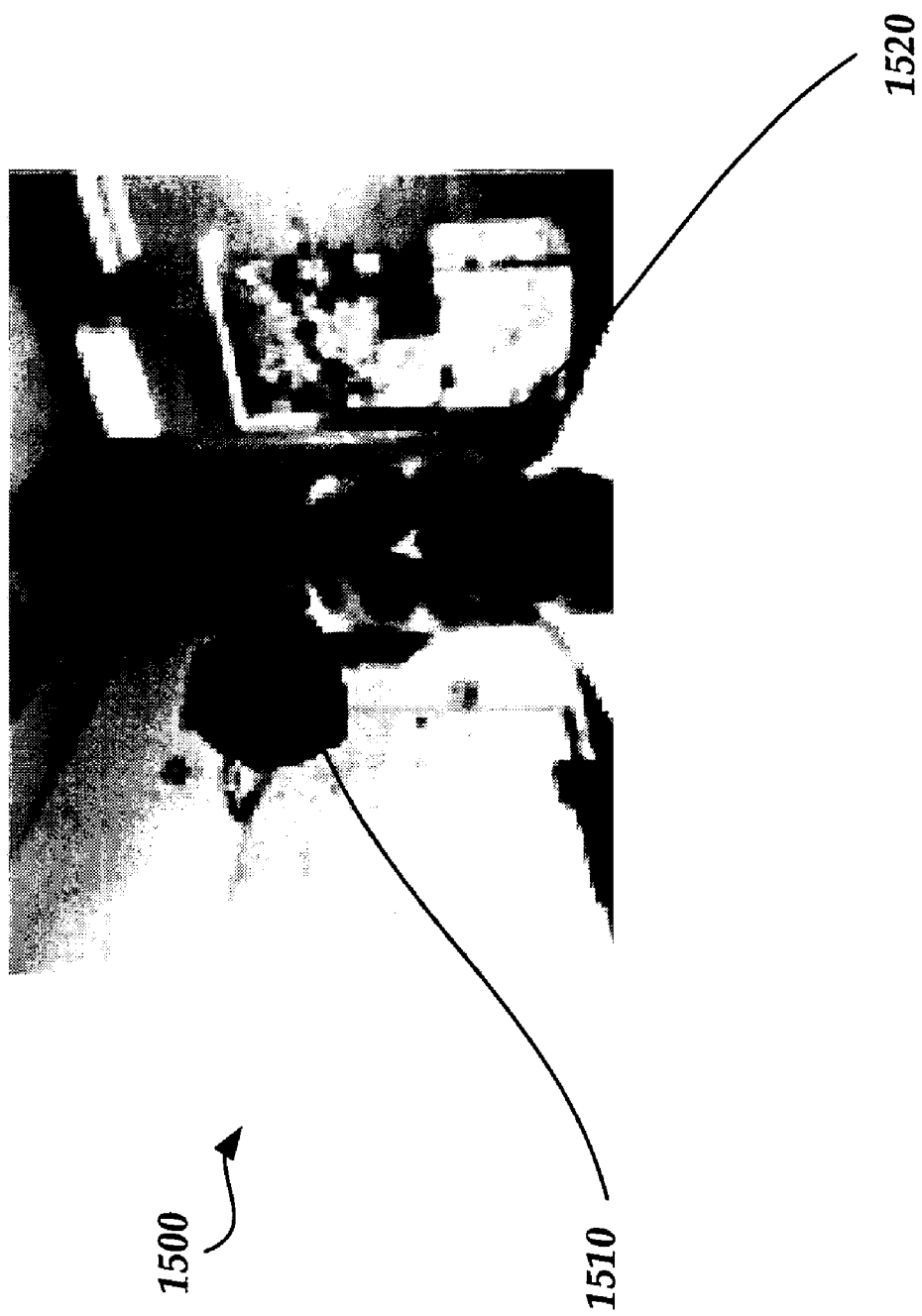
FIG. 15 is an example stereo-based image including a smart-emoticon.
Figure 16:
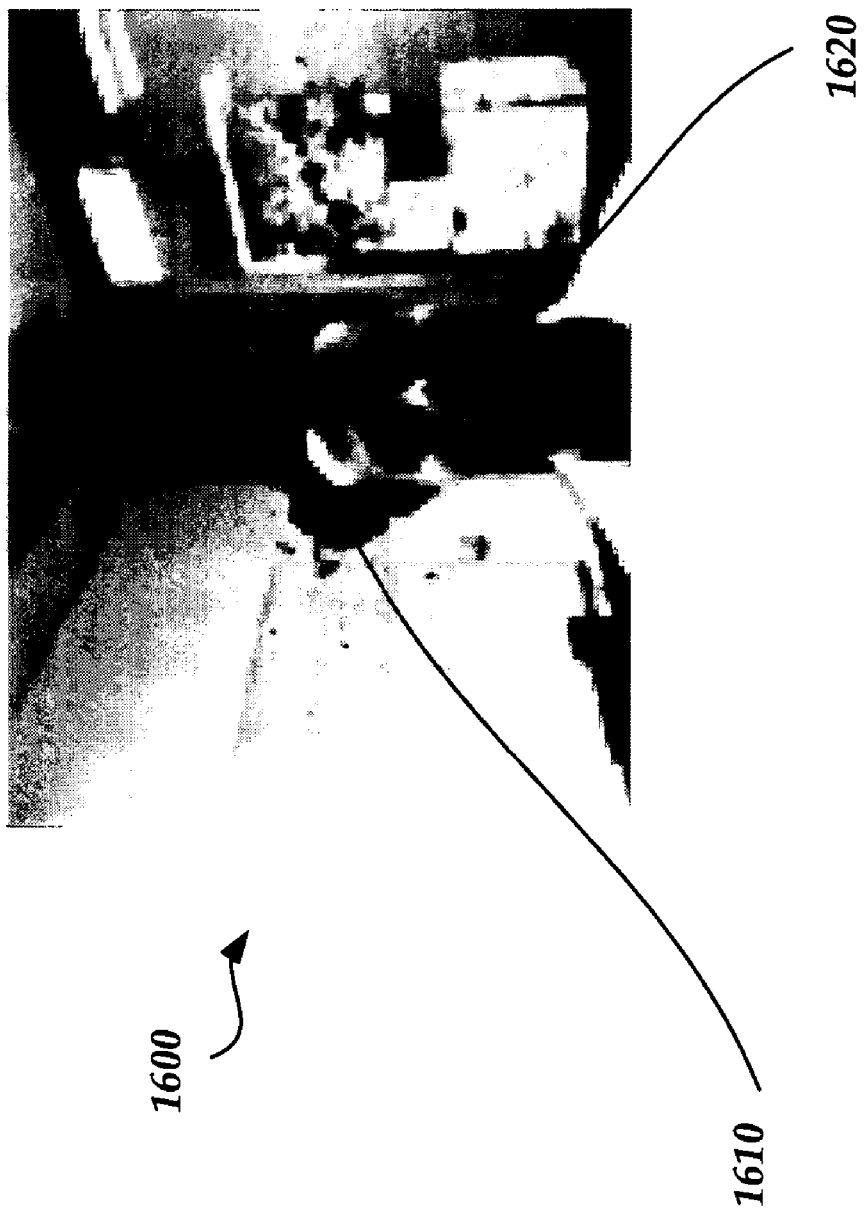
FIG. 16 is a stereo-based image including a smart-emoticon at a subsequent point in time to FIG. 15.
Figure 17:
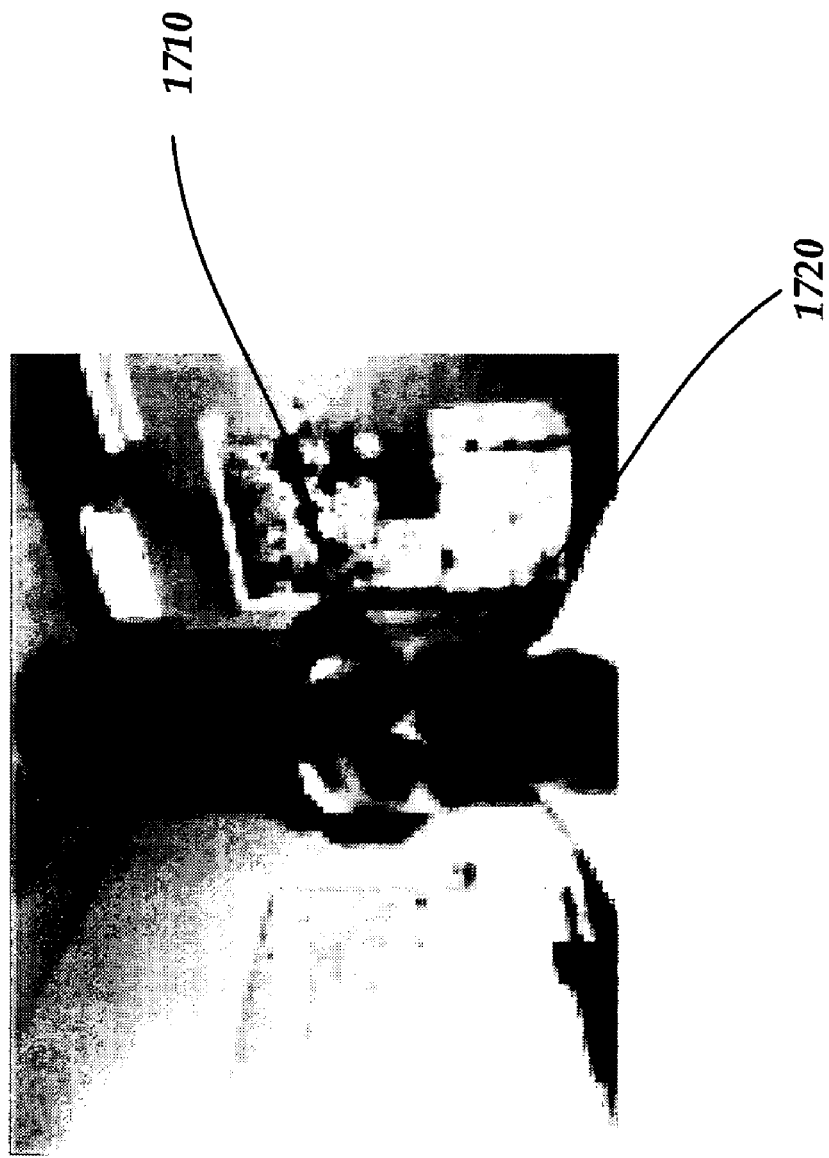
FIG. 17 is a stereo-based image including a smart-emoticon at a subsequent point in time to FIG. 16.
Figure 18:
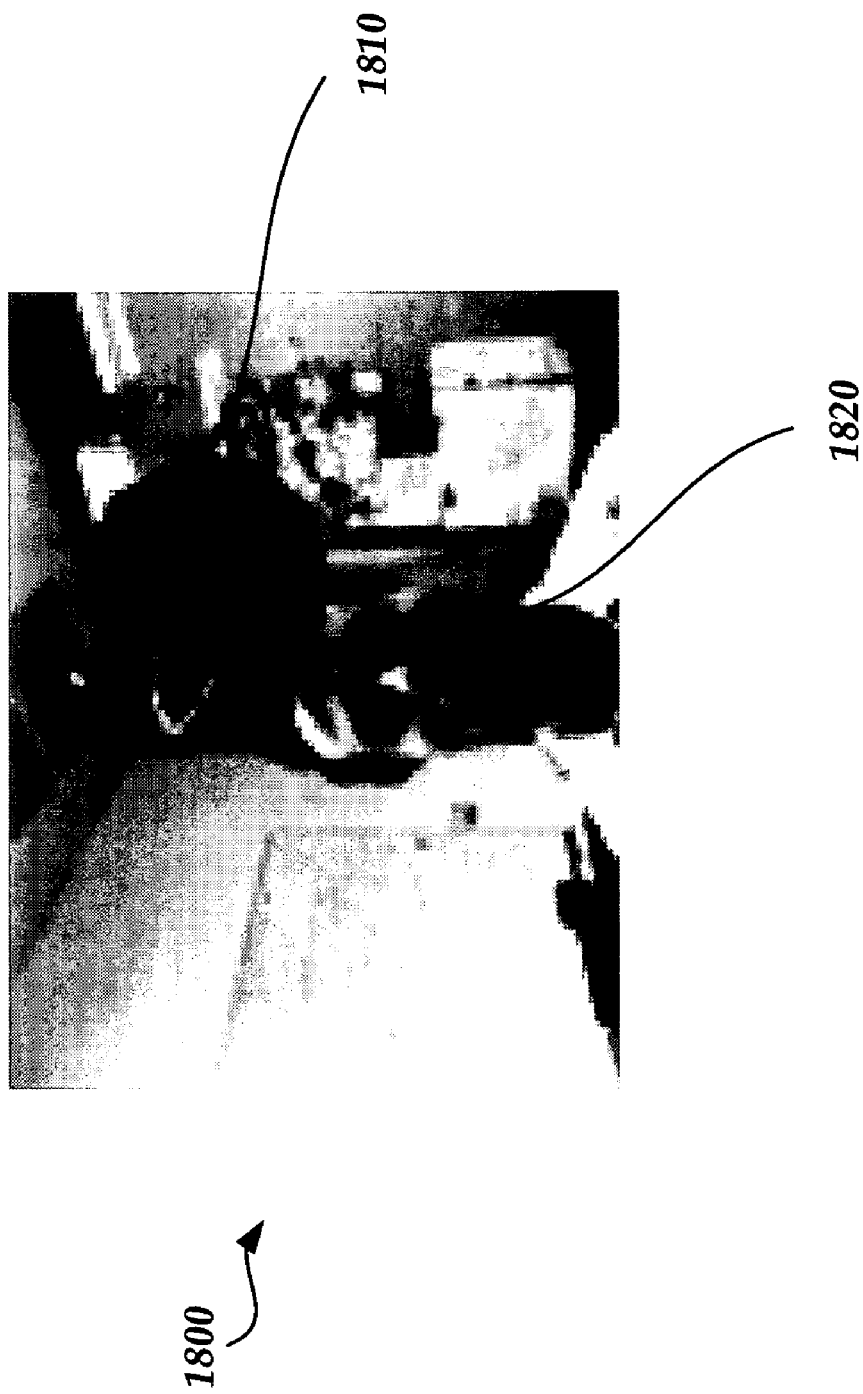
FIG. 18 is a stereo-based image including a smart-emoticon at a subsequent point in time to FIG. 17.

To interact with the located object in the displayed image, the smart-emoticon may move in the three-dimensions of the displayed scene relative to the located object in a displayed series of images. For example, the smart-emoticon may orbit the located object, and/or may follow or track the located object in a series or sequence of images. To orbit the located object, the smart-emoticon may orbit around the located object, e.g., may traverse in front of and behind the located object. FIGS. 15-18 show a sequence of example images of a dynamic smart-emoticon which orbits and tracks the located object. The smart-emoticon of FIGS. 15-18 is also dynamic, e.g., is an animated emoticon indicating a rotating planet with an orbiting ring and star. FIG. 15 illustrates the smart-emoticon 1510 to the left and in front of the located object 1520. FIG. 16 illustrates a subsequent displayed image with the smart-emoticon 1610 to the left and behind the located object 1620. FIG. 17 illustrates a subsequent image with the smart-emoticon 1710 to the right and behind the located object 1720. Similarly, FIG. 18 illustrates a subsequent image with the smart-emoticon 1810 to the right and in front of the located object 1820. In this manner, the smart-emoticon appears to orbit the located object's top, or the top of the located head, appearing to disappear behind the located object as the located object occludes the smart-emoticon.

Figure 22:
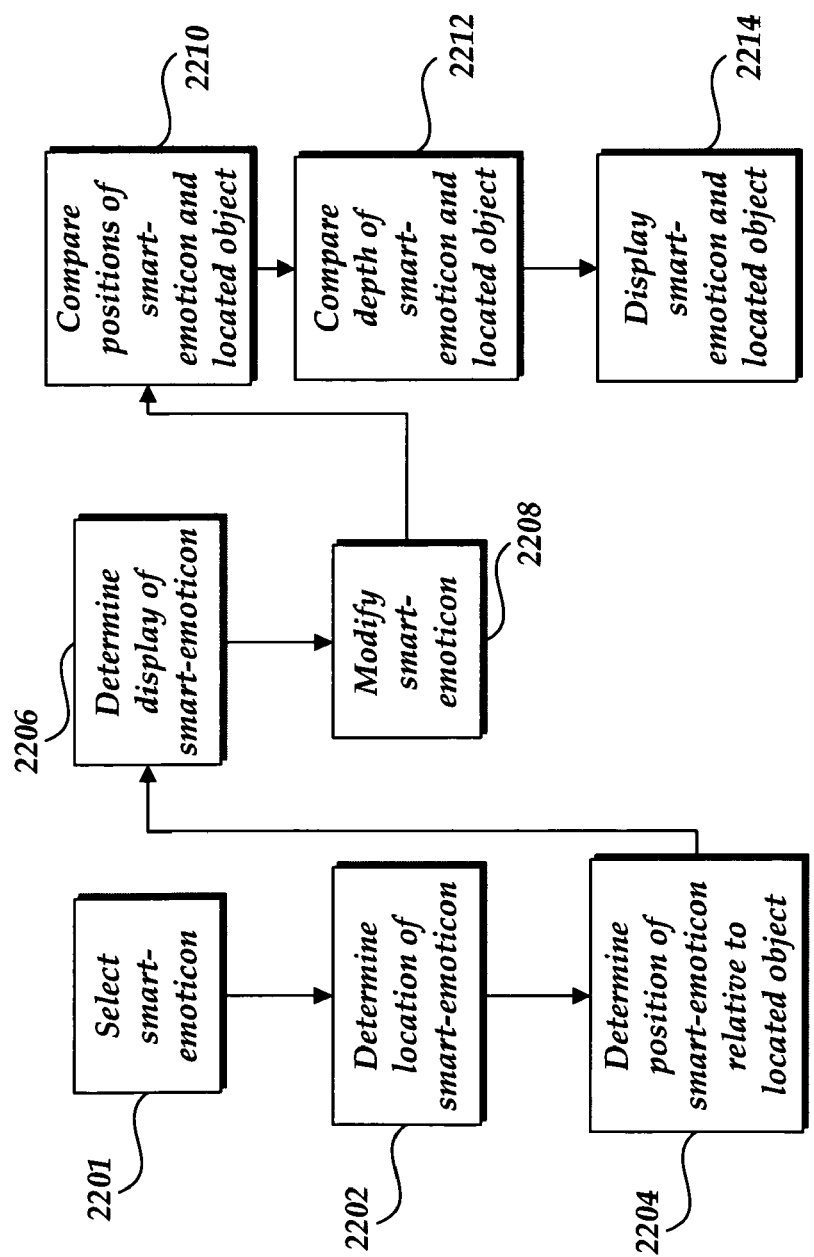
FIG. 22 is a flow chart of an example method of inserting a smart-emoticon into a displayed image.

FIG. 22 shows an example method 2200 for inserting a smart-emoticon into a displayed image with a located object. The smart-emoticon to be inserted may be selected 2201. The located object may itself provide an indication of the smart-emoticon to be inserted and/or a user or system may provide a trigger indicating the smart-emoticon to be selected. For example, a user may insert a throbbing heart over his when teleconferencing with his girlfriend.

To place the object, such as a smart-emoticon, into the displayed image, the location and depth of the located object may be determined 2202 from the disparity map as noted above. The position of the smart-emoticon may be determined 2204 relative to the located object in three-dimensional space. More particularly, the location of the smart-emoticon in three-dimensions of the displayed scene, e.g. horizontal, vertical and depth of the displayed scene may be determined according to any suitable propagation method to orbit or otherwise move the smart-emoticon over time. The depth of the smart-emoticon within the displayed image may be used to modify 2206 the displayed sized of the smart-emoticon. More particularly, as the smart-emoticon, such as smart-emoticon 1710 of FIG. 17, is farther away, the size of the smart-emoticon may be made proportionately smaller to represent the perspective of the smart-emoticon in the illustrated scene. Similarly, as the smart-emoticon, such as smart-emoticon 1810 of FIG. 18, is depicted closer to the camera, the size of the smart-emoticon may be made proportionately larger to represent the change in perspective.

The placement and/or display of the sized smart-emoticon may be determined 2208 relative to the located object within the displayed image. For example, the relative locations of the depicted smart-emoticon and the located object in the scene may be used to determine if one of the smart-emoticon and the located object occlude at least a portion of the other of the smart-emoticon and the located object. Any suitable method or process may be used to determine the occlusion of one or more objects and/or smart-emoticons in the displayed image. For example, the display manipulator module 214 of FIG. 2 or any other suitable process or module may compare 2210 the vertical and horizontal positions of the area of the located object and the area of the smart-emoticon. If at least a portion of the compared areas overlap, at least a portion, then the depths of the located object and the smart-emoticon may be compared to determine which object is in front of the other. The located object and smart-emoticon may then be displayed 2214.

For example, as shown in FIG. 15, the smart emoticon 1510 is depicted closer to the camera than the located object 1520. Moreover, the smart-emoticon has a size and vertical and horizontal placement that locates the smart-emoticon 1510 directly in front of a portion of the located object 1520. In this manner, the depiction of the smart emoticon may occlude the display of the located object in the image scene. However, as the smart-emoticon moves relative to the located object, the located object may occlude the smart-emoticon, to give the appearance that the smart-emoticon is moving behind the located object. For example, as shown in FIG. 16, the smart-emoticon 1610 is depicted farther from the camera than the located object 1620. Moreover, the smart-emoticon has a size and vertical and horizontal placement that locates the smart-emoticon 1610 directly behind and occluded by a portion of the located object 1520.

In many cases, the located object in the scene, such as the head and shoulders of a user of the computing system, are not static over time. More particularly, the position of the located object may move relative the location of the located object in the previous image of a sequence or series of images. The determination and/or propagation of the smart-emoticon may incorporate the movement of the located object in determining the placement and depiction of the smart-emoticon. For example, the orbit or other movement of the smart-emoticon may be adjusted to ensure that the orbit continues to be proximate to the located object, and may ensure that the smart-emoticon does not 'impact' the located object. In some cases the movement of the smart-emoticon may be smoothed or damped to reduce jittering and/or jumps of the smart-emoticon as it moves within the displayed image.

Background Modification

In many cases, the object represented in the kernel image to be located in the disparity map may be the only object of interest in the displayed image. For example, in some conferencing examples, the object of interest may be the speaker and not the background office or other action occurring or objects positioned around the speaker. In this manner, the attention of the recipient of the displayed image may be focused on the located object by highlighting the located object and/or de-emphasizing the background in the displayed image.

Figure 19:
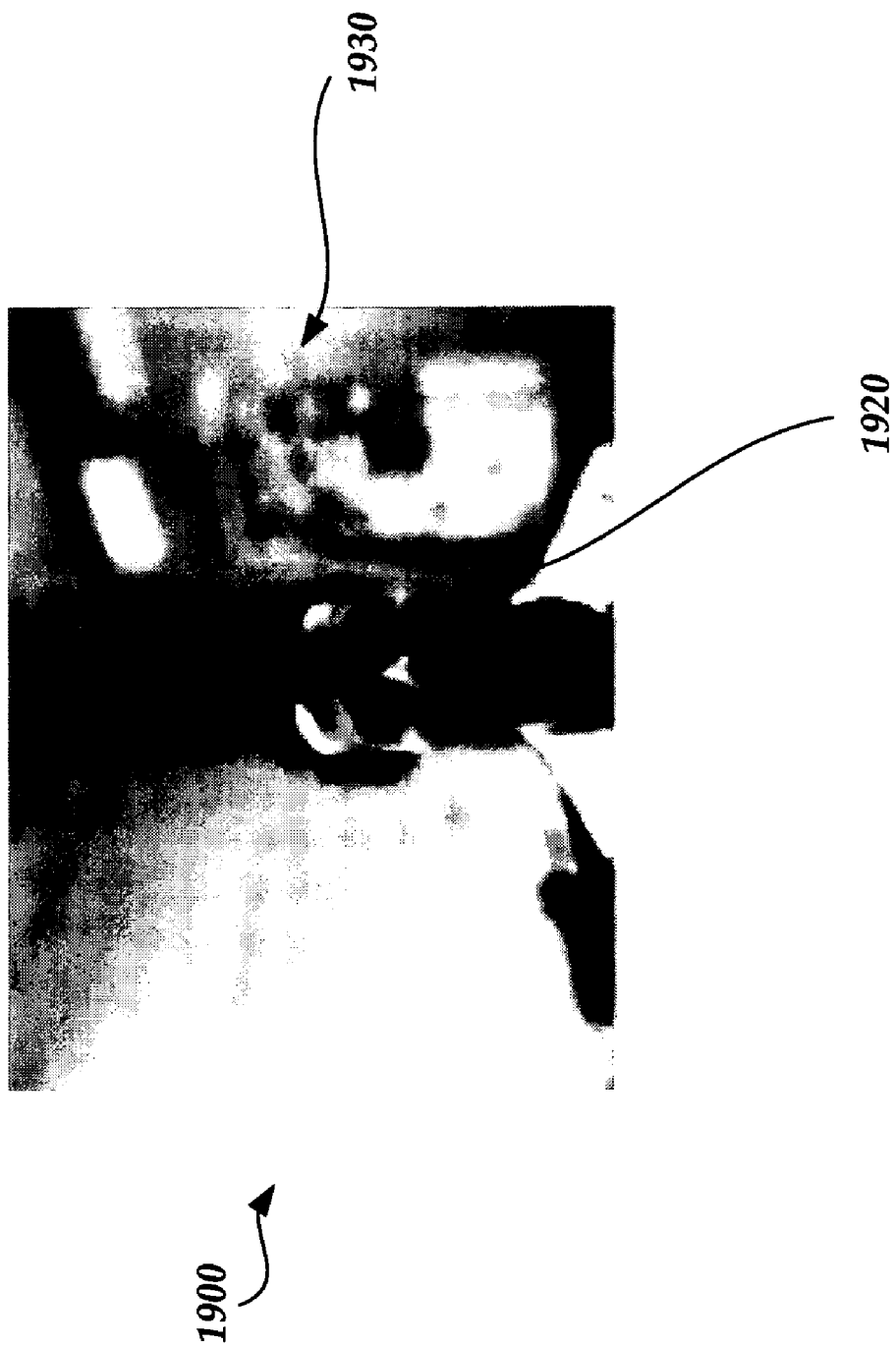
FIG. 19 is an example stereo-based image with a blurred background proximate the located object.

For example, the background, e.g., those portions or areas of the displayed image which are not the located object whether or not those objects are in closer to or further away from the camera than the located object, may be blurred. An example of background blurring is shown in the example image 1900 of FIG. 19. In displayed image 1900, the located object 1920, e.g., the head and shoulders of a person, stands out or catches the viewer's attention since the background 1930 is blurred to reduce distraction from the object of interest and/or to protect the privacy of background objects of the scene. The blurring of the background may also reduce the storage and/or communication media requirements for the image 1900 as compared to an image without a blurred background.

In yet another example, the background may be stored and/or transmitted using communication media at a different compression rate than the object of interest. More particularly, the located object may be compressed to retain a high fidelity of the image, and the background, e.g., those portions of the image which are not the located object, may be compressed at a lower rate. In this manner, the efficiency of the compression and/or data transmission of the image may be improved by reducing the data required to represent and/or transmit the background portions of the image while retaining a high fidelity of the located object in the displayed image.

Figure 20:
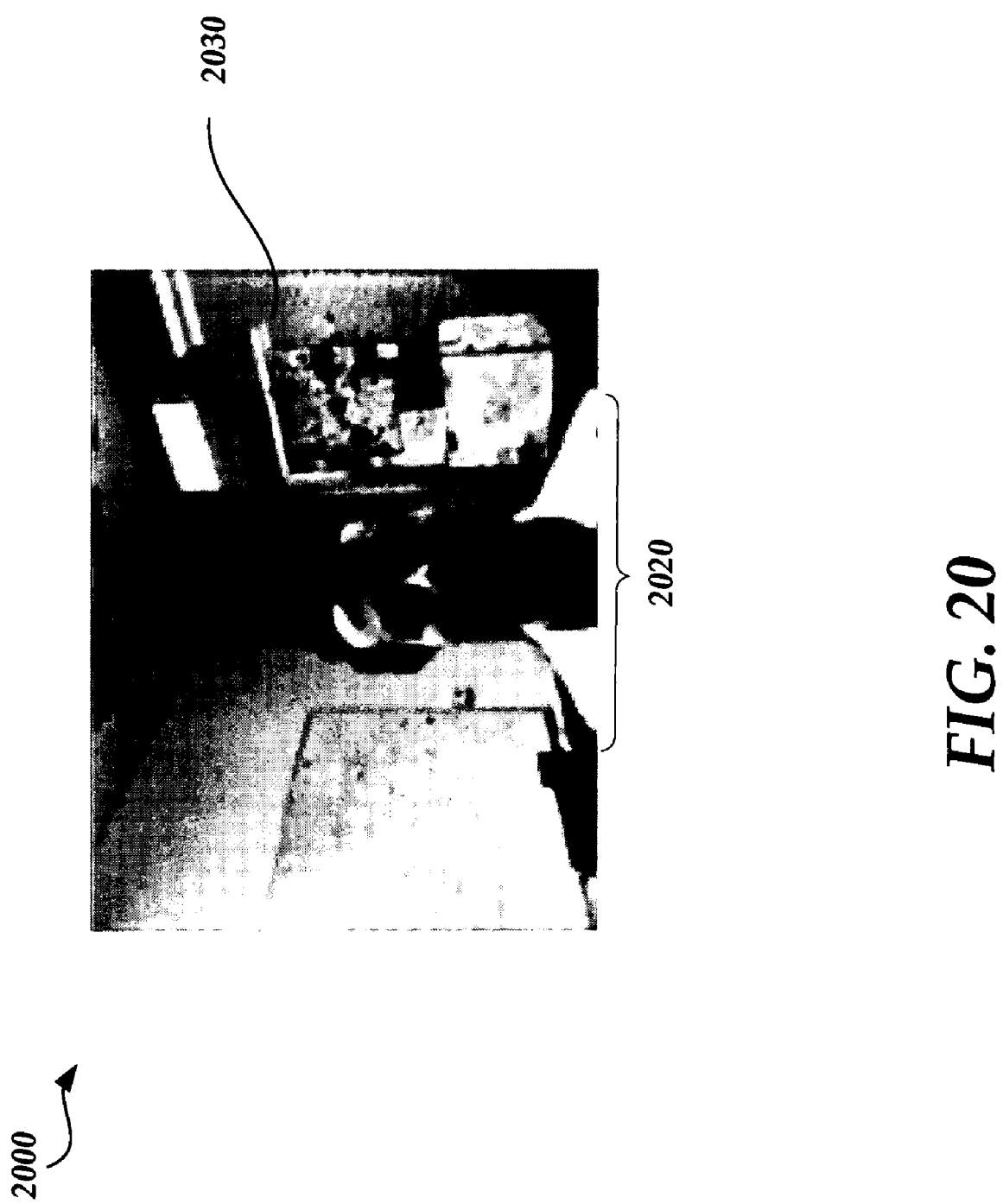
FIG. 20 is an example stereo-based image representing a color modified background proximate the located object.

In another example, portions or areas of the displayed image may be color modified to highlight the object of interest (e.g., the located object) and/or de-emphasize the background. For example, an example stereo-based image 1200 is shown in FIG. 20. The object of interest 1220, e.g., the person's head and shoulders may be displayed in color, and the background 1230 may be displayed in shades of black, white, gray, or any other suitable color. In this manner, the object of interest, here the person speaking in a teleconference, may be highlighted or emphasized with respect to other displayed objects in the image. The color of the located object may be modified to highlight the object. Additionally or alternativley, the background color, shading, and the like may be muted, modified and the like to de-emphasize the background.

In another example, at least a portion of the background of the image may be removed and/or replaced. For example, the background may be removed such that the displayed image includes only the object of interest, e.g., the located object. In a further example, the removed background may be replaced with a predetermined background. The predetermined background may be the background of a prior image of the scene. In this manner, the background appears to remain static, but may fairly represent the background of the object of interest. In another example, an easily compressed and/or transmitted background, such as a solid color, and the like, may replace the background. In some cases, to reduce the communication media requirements for sending the image, the background may be removed before transmission, and then replaced with a predetermined background by the receiving computing system. For example, the sender of the image may remove the background and send an image containing the located object. The receiving computing system may replace or fill the removed background with any suitable background, such as a constant color, a predetermined image (e.g., a beach scene), a background portion of the image from a prior image of a similar scene, and the like.

Figure 21:
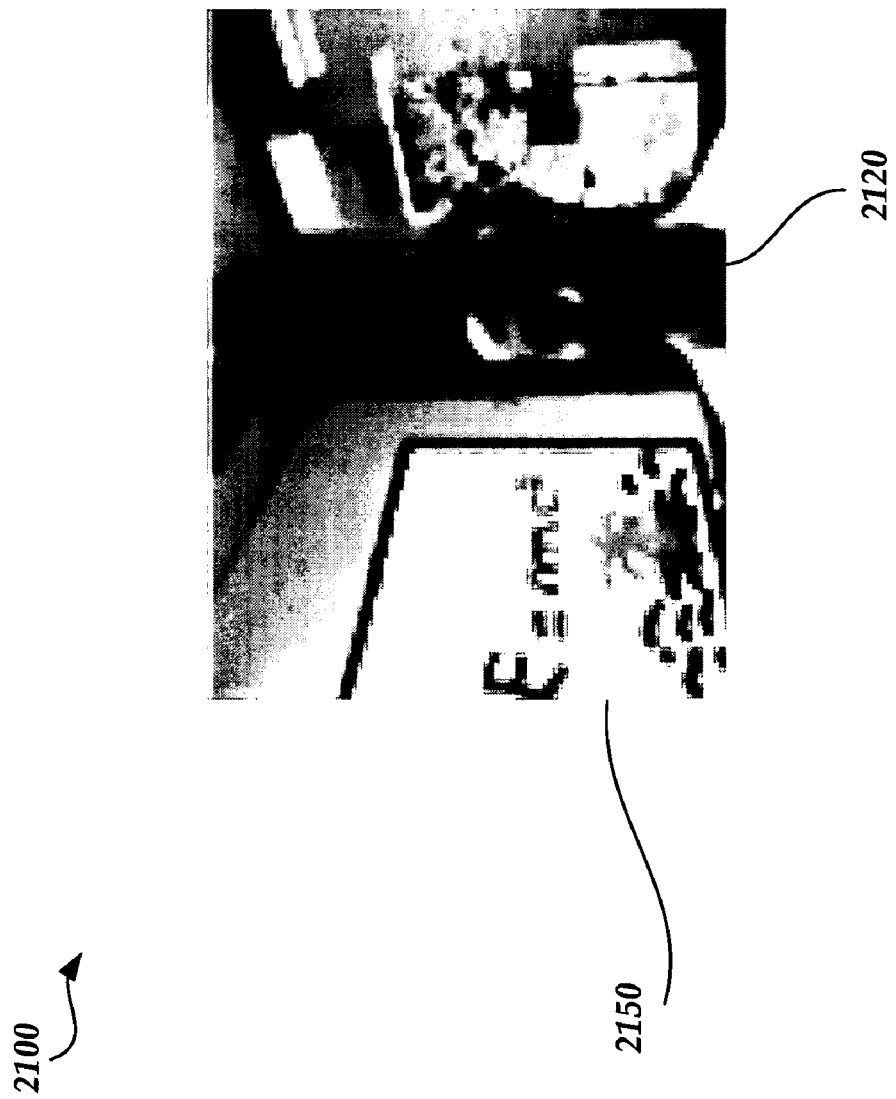
FIG. 21 is an example stereo-based image with a portion of the background replaced.

FIG. 21 illustrates an example image 2100 depicting a replacement of a portion of the background. The portion of the background to be replaced may be indicated in any suitable manner. For example, a user may view an initial stereo-based image with or without a located object. The user may identify and/or indicate portions of the image to be replaced. For example, as shown in FIG. 21, a user may highlight, encircle, or indicate in any suitable manner, the whiteboard 2150 as a portion of the background to be replaced. If the cameras are static, e.g., non-moving, then the portion of the background to be replaced may be identified as pixel locations in the stereo-based image. The indicated portion of the background to be replaced may be represented in a kernel image as another object to be located within the displayed image. In subsequent displayed images, the indicated portion of the background may be located in the disparity map, and correlated with the object in the displayed image. As in the example above with insertion of an object, the portion of the background being replaced may be inserted into the 3-dimensions of the objects within the image at a particular depth. In this manner, occlusions and/or disocclusions by object in the image may be interpreted based upon the disparity and/or depth determinations.

Face Detection

Face detection techniques have been used to determine and track faces within the field of view of a monocular camera. Monocular camera face detection may require full-frontal and un-occluded images of a person's face and/or specific lighting conditions to accurately detect a face and/or recognition of a face. However, locating an object within an image using a disparity map and a kernel image may locate the person's head regardless of the rotation of a person's head, occlusion of a portion of the face, lighting, and the like. In this manner, the stereo image processing described above may more efficiently and/or more robustly locate a person's face within an image.

Monocular camera face detection techniques may require large amounts of computational time if required to search through an entire image for a set of features which represent a face. To localize face detection and/or recognition in an image, the located object having predetermined disparity characteristics, e.g., a person's head and shoulders, may be used as a starting point and/or boundary limitation for face recognition search parameters. More particularly, the surface profile of a person's head may be determined or distinguished by comparing a kernel image with a disparity map of input images. Any located surface profiles of a head may be used as a starting point to search for and/or match facial features, since it may be unlikely that faces will be within the image without the accompanying head shape.

Object Presence

One or more kernel images may be compared to at least portion of a disparity map to determine and/or locate represented objects within the input image. The stereo-based and/or input images may then be associated with an object identifier which identifies and/or indicates which objects are likely present within the associated image. More particularly, the kernel image may be associated with an object identifier. If the object represented in the kernel image is located within the disparity map, then the object identifier may be associated with the image. It is to be appreciated that the object identifier may be any suitable identifier, such as an object name or label, an indication of present or not present, and the like. Associating an image with an object identifier may be used to catalog, sort, and/or search static images, e.g., a personal digital photo album may be sorted as to which images include people, mountains, and the like.

A sequence or series of video images, e.g. streaming video, with one or more object identifiers may be associated as a whole with one or more object identifiers based upon one or more objects being located within the video stream. Alternatively, one or more images within the video stream may be associated with an object identifier to index the video. For example, a security video may be indexed to highlight those portions of the video where one or more people are detected within the video image stream, objects detected in a particular portion of the scene, and the like.

Images associated with a predetermined object identifier may be stored for later review, and in some cases, those images of the video stream which do not contain any object of interest may be removed from memory. In this manner, the video stream itself may be used as an 'object detector', which may trigger selective recording and/or storage of the video stream when particular objects are detected in the image. Selective recording may be useful in a variety of applications including indicating activity at a casino's exchange window, a casino table, an automatic teller machine, a cab stand, an entryway, a police vehicle, and the like.

In some cases, the presence of a detected object in the image may be used to provide a status or other indication of the scene. For example, in an instant messenger application, the presence of a head and shoulders in front of a computer may provide an indication that the user is present and on-line, and likely to notice an instant message on their computing system.

The detection of a predetermined object within an image may be used to send a warning or other indication of object presence. For example, a vehicle may receive a proximity warning if a processed stereo-based image indicates that a person or other object is behind or proximate to the vehicle. In some cases, the size and or type of object may be indicated. For example, the relative size of the object may be determined based on known objects within the picture and/or the depth of the detected object. The size of the object may provide an indication to the driver if the object is at tire level, e.g., can be climbed, or is high enough to damage the vehicle. In another example, a vision impaired person may receive a warning that there is an object of some type in front of them, or that cars are present in the street.

Object Position and/or Orientation

The position of the located object within the image may be tracked and/or detected. In this manner, the detection of movement, e.g., change in location of the located object, may be used as an input device and/or indicator of status or action to be taken. For example, in an electronic gaming application, the position of the user's head may be fed back into the game such that the user may 'dodge' bullets within the gaming environment by moving their head within the field of view of attached cameras.

In another example, the position, orientation, and/or movement of the head or other object over time may provide input to a local application as a non-standard input device to the computing system, for example for use by a disabled person. More particularly, patterns or series of kernel images of a person's head or other predetermined object over time may be compared to a predetermined pattern stored by the stereo-based image processing system. The predetermined pattern may be associated with an action or command, such as open, delete, lights on, change channel, increase volume, and the like to a system. In this manner, the location of the object over time may be used as a form of gesture based input. For example, a movement of a user's head may indicate a relative movement and/or 'click' of a cursor on a display screen of the computing system.

In another example of gesture based input, two or more kernel images may be compared to the disparity map. Each kernel image may provide a particular gesture or position which may be associated with an action or command. For example, a kernel image representing an object as a head tilted to the right may indicate a particular command, and another kernel image representing an object as a hand raised with two fingers extended may indicate another particular command. It is to be appreciated that any particular position of one or more objects, such as a person's body or inanimate props, may be used to provide the appropriate surface profile detected by the stereo-based image processing system discussed above.

Camera Stabilization/Focus

The detected depth and/or position may provide feedback to one or more cameras. For example, the determined depth of the located object may be used as input to focus one or more cameras on the detected object. The camera receiving the depth information may be the two or more stereo cameras providing the image, or may be another one or more cameras imaging the scene. Similarly, the location of the detected object within the stereo-based image may provide feedback to a camera system. For example, if the detected object is moving near an edge of the field of view of an imaging camera, the imaging camera may be re-pointed to ensure that the detected object stays within the field of view of the camera. In another example, the depth data of a detected object in an image may be used for a stabilization algorithm. For example, the relative movement of the object in subsequent input images along with the depth values of the located object may be used to selectively stabilize the resulting video stream.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples, and data provide a complete description of the structure and use of exemplary embodiments of the invention. Since many embodiments of the invention can be made without departing from the spirit and scope of the invention, the invention resides in the claims hereinafter appended.

The invention claimed is:

1. A method:
    determining a disparity map based on a first image and a second image, the disparity map containing a first disparity value of a pixel representing a stationary object in the first image and the second image;
    comparing a first predetermined kernel image to an area portion of the disparity map including the first disparity value, wherein the first predetermined kernel image contains at least one first disparity value representing a first object and wherein the first predetermined kernel image represents a modified image of a model person's head and shoulders and the modified image has been asymmetrically expanded horizontally;
    computing a score based on the comparison of the first predetermined kernel image and the area portion; and
    indicating an object in a stereo-based image based on the first image and the second image, based on the score;
    wherein the determining, comparing, computing and indicating are performed by one or more processors.

2. The method of claim 1, further comprising:
    determining a first depth of the first disparity value.

3. The method of claim 1, wherein the disparity map contains a plurality of disparity values, the method further comprising comparing each of the plurality of disparity values to at least one disparity value of the first kernel image.

4. The method of claim 2, further comprising modifying a size of the first kernel image based on the first depth.

5. The method of claim 4, further comprising selecting the area portion of the disparity map based on the size of the kernel image.

6. The method of claim 1, further comprising cropping a stereo-based image that is based on the first image and the second image, based on the score.

7. The method of claim 6, further comprising digitally zooming the cropped stereo-based image based on a depth of at least a portion of the area portion.

8. The method of claim 1, further comprising displaying a stereo-based image based on the first image and the second image, at least a portion of a background of the displayed stereo-based image being modified, the background excluding an object portion of the stereo-based image associated with the area portion of the disparity map.

9. The method of claim 1, further comprising localizing a search for features of the first image and the second image based on the score.

10. The method of claim 1, further comprising comparing at least a portion of the area portion with a predetermined second kernel image, the second kernel image containing at least one second disparity value representing a second object.

11. The method of claim 1, further comprising, based on the score, associating a first object identifier with at least one of the first image, the second image, or a stereo-based image that is based on the first image and the second image.

12. The method of claim 1, further comprising determining a location of a top of an object represented in the area portion, and re-selecting a center point of the object based on the location of the top of the object and a depth of at least a portion of the object.

13. The method of claim 1, wherein in the modified image of the model person's head and shoulders, the head but not the shoulders has been asymmetrically expanded horizontally.

14. The method of claim 13, comprising locating, based on the score, an object in a stereo-based image that is based on the first image and the second image, wherein the located object includes an image of a person's head and an image of an object proximate to the person's head.

15. The method of claim 1, comprising generating the first kernel image.

16. A method comprising:
    determining a disparity map based on a first image and a second image, the disparity map containing a first disparity value of a pixel representing a stationary object in the first image and the second image;
    comparing a first predetermined kernel image to an area portion of the disparity map including the first disparity value, the first predetermined kernel image containing at least one first disparity value representing a first object; and
    computing a score based on the comparison of the first kernel image and the area portion; and
    inserting a smart-emoticon into a stereo-based image based on the first image and the second image, and displaying the smart-emoticon at least partially occluded by an object in the stereo-based image based on a second disparity value of the disparity map.

17. One or more computer readable storage media comprising computer executable instructions that, when executed, cause a computer to perform a method comprising:
    determining a disparity map based on a first image and a second image, the disparity map containing a disparity value of a pixel representing a scene object in the first image and the second image;
    comparing a predetermined kernel image to an area portion of the disparity map including the disparity value, wherein the predetermined kernel image contains at least one disparity value representing a comparison object and wherein the predetermined kernel image represents a modified image of a model person's head and shoulders wherein the head but not the shoulders has been asymmetrically expanded horizontally; and
    computing a score based on the comparison of the predetermined kernel image and the area portion, the score being additionally based on at least one of a) a previous position of the scene object in a prior disparity map, b) at least one of a distance of the pixel from a center of the first image or a distance of the pixel from a center of the second image, or c) the disparity value; and
    indicating an object in a stereo-based image based on the first image and the second image, based on the score.

18. The one or more computer readable storage media of claim 17, wherein computing the score includes computing a linear function of the digital signal processing cost function and at least one of a previous position of the scene object in a prior disparity map, a distance of the pixel from a center of the first image and/or the second image, and the disparity value.

19. The computer readable storage media of claim 17, wherein the media comprise instructions for causing the computer to generate the first kernel image.

* * * * *